US012735568B2

(12) United States Patent
Crawford et al.

(10) Patent No.: US 12,735,568 B2
(45) Date of Patent: Sep. 15, 2026

(54) POLYESTERAMIDES, PROCESSES FOR THE PREPARATION THEREOF, AND POLYESTERAMIDE COMPOSITIONS

(71) Applicant: Eastman Chemical Company, Kingsport, TN (US)

(72) Inventors: Emmett Dudley Crawford, Kingsport, TN (US); Scott Ellery George, Kingsport, TN (US); Kaan Gunes, Houston, TX (US); Paul Hastings, Milford, MA (US); Aristotelis Karagiannis, Amherst, MA (US); Aireal Denise Pressley, Kingsport, TN (US); Pinguan Zheng, Johnson City, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 18/419,778

(22) Filed: Jan. 23, 2024

(65) Prior Publication Data

US 2024/0174857 A1 May 30, 2024

Related U.S. Application Data

(63) Continuation of application No. 16/960,654, filed as application No. PCT/US2019/013953 on Jan. 17, 2019, now abandoned.

(60) Provisional application No. 62/620,563, filed on Jan. 23, 2018.

(51) Int. Cl.

| | |
|---|---|
| ***C08L 77/12*** | (2006.01) |
| ***B32B 17/10*** | (2006.01) |
| ***B32B 27/08*** | (2006.01) |
| ***B32B 27/36*** | (2006.01) |
| ***C08G 69/44*** | (2006.01) |
| ***C08G 73/10*** | (2006.01) |
| ***C08G 73/16*** | (2006.01) |
| ***C08J 5/18*** | (2006.01) |
| ***C08K 3/34*** | (2006.01) |
| ***C08K 5/053*** | (2006.01) |
| ***C08K 5/092*** | (2006.01) |
| ***C08K 5/17*** | (2006.01) |
| ***C08K 5/5435*** | (2006.01) |
| ***C08K 5/5465*** | (2006.01) |

(52) U.S. Cl.

CPC ........ *C08L 77/12* (2013.01); *B32B 17/10036* (2013.01); *B32B 17/10724* (2013.01); *B32B 17/10779* (2013.01); *B32B 27/08* (2013.01); *B32B 27/36* (2013.01); *C08G 69/44* (2013.01); *C08G 73/1003* (2013.01); *C08G 73/16* (2013.01); *C08J 5/18* (2013.01); *C08K 3/34* (2013.01); *C08K 5/053* (2013.01); *C08K 5/092* (2013.01); *C08K 5/17* (2013.01); *C08K 5/5435* (2013.01); *C08K 5/5465* (2013.01); *B32B 2250/03* (2013.01); *B32B 2250/24* (2013.01); *B32B 2250/40* (2013.01); *B32B 2307/412* (2013.01); *B32B 2313/00* (2013.01); *B32B 2367/00* (2013.01); *B32B 2377/00* (2013.01)

(58) Field of Classification Search

None

See application file for complete search history.

(56) References Cited

U.S. PATENT DOCUMENTS

| | | | | |
|---|---|---|---|---|
| 2,191,367 | A | | 2/1940 | Carothers |
| 4,482,587 | A | | 11/1984 | Fagerburg et al. |
| 4,611,051 | A | | 9/1986 | Hayes et al. |
| 4,953,885 | A | * | 9/1990 | Comert .................... A63C 5/12 280/610 |
| 5,446,079 | A | | 8/1995 | Buchanan et al. |
| 5,644,020 | A | | 7/1997 | Timmermann et al. |
| 6,353,084 | B1 | | 3/2002 | Warzelhan et al. |
| 11,767,429 | B2 | * | 9/2023 | Cannon .................. C08G 69/44 524/605 |
| 11,845,864 | B2 | * | 12/2023 | Karagiannis ....... C08G 73/1003 |
| 2007/0003746 | A1 | | 1/2007 | Wenjie et al. |
| 2010/0203275 | A1 | | 8/2010 | Hoffman et al. |
| 2019/0194392 | A1 | | 6/2019 | Minkwitz et al. |

FOREIGN PATENT DOCUMENTS

| | | | | |
|---|---|---|---|---|
| AU | 2007358034 | A1 | * | 2/2009 |
| CN | 1183428 | A | | 6/1998 |
| CN | 106967214 | B | | 7/2019 |
| EP | 0879265 | B1 | * | 10/2000 |
| EP | 0736557 | A1 | | 2/2001 |
| EP | 2022810 | A1 | * | 2/2009 |
| EP | 1928969 | B1 | | 4/2010 |
| EP | 1 397 415 | B1 | | 9/2010 |
| EP | 2277937 | B1 | | 7/2012 |
| EP | 3765287 | A1 | | 1/2021 |

(Continued)

OTHER PUBLICATIONS

Office Action dated Jul. 12, 2022 received in U.S. Appl. No. 16/960,663.

Office Action dated Nov. 3, 2022 received in U.S. Appl. No. 16/960,663.

*Primary Examiner* — Tae H Yoon

(74) *Attorney, Agent, or Firm* — Kenrick L. Vidale

(57) ABSTRACT

The present application discloses novel polyesteramides comprising cycloalkyl diols and/or cycloalkyl dialkanols with tunable properties based on the monomers and monomer ratios used to prepare the polyesteramides and varying the reaction conditions. The present application also discloses compositions and articles.

15 Claims, No Drawings

(56) References Cited

FOREIGN PATENT DOCUMENTS

| | | | | |
|---|---|---|---|---|
| JP | 08293408 | | | 11/1996 |
| JP | 09316232 | A | | 12/1997 |
| JP | 2001-131524 | | | 5/2001 |
| JP | 2003176350 | A | | 6/2003 |
| JP | 2003176351 | A | * | 6/2003 |
| JP | 3705615 | B2 | * | 10/2005 |
| JP | 2009507956 | A | | 2/2009 |
| JP | 5221423 | B2 | | 6/2013 |
| JP | 2014-0077108 | | | 6/2014 |
| KR | 2014-0077108 | | | 6/2014 |
| WO | WO 2009/012607 | A2 | * | 1/2009 |
| WO | WO 2019 147457 | A3 | | 8/2019 |
| WO | WO 2019 147671 | A1 | | 8/2019 |
| WO | WO 2019/147676 | A1 | | 8/2019 |

* cited by examiner

POLYESTERAMIDES, PROCESSES FOR THE PREPARATION THEREOF, AND POLYESTERAMIDE COMPOSITIONS

CROSS-REFERENCE TO RELATED APPLICATION(S)

This application is a continuation of U.S. application Ser. No. 16/960,654 filed on Jul. 8, 2020, now abandoned, which is a national stage filing under 35 USC § 371 of International Application Number PCT/US2019/013953, filed on, Jan. 17, 2019 which claims the benefit of the filing date to U.S. Provisional Application No. 62/620,563, filed on Jan. 23, 2018, the entire disclosures of which are incorporated by reference herein.

BACKGROUND OF THE INVENTION

Thermoplastic polymers are useful in a wide variety of applications, including, for example, various electrical, automotive, medical, consumer, industrial, and packaging applications. Thermoplastic polymers are advantaged over thermoset plastics in that thermoplastic polymers can be easily melt processed into a variety of useful articles.

Different types of thermoplastic polymers have different properties that make them desirable for certain end uses. Elastomeric thermoplastic polymers generally have glass transition temperature values below room temperature and low modulus values making them suitable for applications requiring flexibility and stretchability. In contrast, rigid thermoplastic polymers generally have glass transition temperature values above room temperature and high modulus values making them suitable for applications requiring stiffness and strength.

Polyesteramides are one class of thermoplastic polymers which are formed from the polycondensation of diacids, diols, and diamines (e.g., WO2008112833, U.S. Pat. Nos. 5,672,676, 2,281,415, CA2317747). Polyesteramides have attracted strong industrial interest primarily because of their excellent heat resistance properties (U.S. Pat. No. 5,672,676), their amenability to processing and their potential for biodegradability. (e.g., WO2008112833)

The present application discloses novel polyesteramides comprising TMCD and/or CHDM having tunable properties by adjusting the monomer ratios and varying the reaction conditions. The polyesteramides are useful in a variety of engineering plastics applications wherein chemical resistance, UV resistance, moisture barrier, surface energy, heat resistance, mechanical, optical, and/or melt processibility properties are important.

SUMMARY OF THE INVENTION

The present application discloses a polyesteramide comprising:

(a) a diamine component comprising:

1 to 99 mole % of diamine residues derived from diamine chosen from $CH_2((C_{3-8})cycloalkyl\text{-}NH_2)_2$;

(b) a diol component comprising:

1 to 99 mole % of diol residues derived from a diol chosen from $(C_{3-8})$cycloalkyl di($(C_{1-3})$alkanol); and (c) a diacid component comprising:

10 to 100 mole % of diacid residues derived from a diacid chosen from $HO_2C—(C_{2-40})$alkylene-$CO_2H$, or $HO_2C—(C_{3-10})$cycloalkyl-$CO_2H$;

wherein each cycloalkyl is unsubstituted or substituted by 1-4 $(C_{1-3})$alkyl, wherein the total mole % of the diacid component is 100 mole %, and wherein the total mole % of the combined diol and diamine component is 100 mole %.

The present application also discloses compositions and articles comprising the polyesteramides and processes for making the polyesteramides.

DETAILED DESCRIPTION OF THE INVENTION

In this specification and in the claims that follow, reference will be made to a number of terms, which shall be defined to have the following meanings.

The singular forms "a," "an," and "the" include plural referents unless the context clearly dictates otherwise.

"Diol" means a chemical with two alcohol functional groups. Examples include 1,4-butanediol, propylene glycol, 2,2,4,4-tetramethyl-1,3-cyclobutanediol, 1,4-cyclohexanedimethanol, propylene-1,3-diol, and the like.

"Diamine" means a chemical with two amino functional groups. Examples include 1,6-diaminohexane, ethylenediamine, 4,4'-methylenebis(2-methylcyclohexylamine), 5-amino-1,3,3-trimethylcyclohexanemethylamine, 4,4'-methylenebis(cyclohexylamine), 1,4-bis(aminomethyl)cyclohexane and the like.

"Alkanol" means an alkane or alkyl group comprising an alcohol group. Examples include methanol, ethanol, propanol, butyl alcohol, and the like.

"Diacid" means a chemical with two carboxylic acid groups. Examples include 1,12-dodecanedioic acid, adipic acid, Cyclohexanedicarboxylic and the like.

Values may be expressed as "about" or "approximately" a given number. Similarly, ranges may be expressed herein as from "about" one particular value and/or to "about" or another particular value. When such a range is expressed, another aspect includes from the one particular value and/or to the other particular value. Similarly, when values are expressed as approximations, by use of the antecedent "about," it will be understood that the particular value forms another aspect.

As used herein the term "chosen from" when used with "and" or "or" have the following meanings: For example, a variable chosen from A, B and C means that the variable can be A alone, B alone, or C alone. For example, a variable A, B, or C means that the variable can be A alone, B alone, C alone, A and B in combination, B and C, A and C in combination, or A, B, and C in combination.

As used herein, the term "residue(s)" refers to the monomer unit or repeating unit in a polymer, oligomer or dimer. For example, a polymer can be made from the condensation of the following monomers: terephthalic acid ("TPA") and cyclohexyl-1,4-dimethanol ("CHDM"). The condensation results in the loss of water molecules. The residues in the resulting polymer are derived from either terephthalic acid and cyclohexyl-1,4-dimethanol.

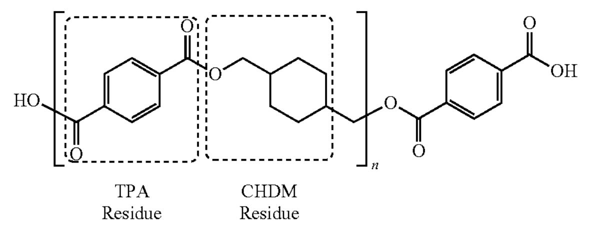

The polymer can also be functionalized by other reactants (e.g., epoxides, isocyanates, and the like) during and after the polymerization reaction. The incorporated reactants are also considered residues.

The terms "containing" or "including" are intended to be synonymous with the term "comprising", meaning that at least the named compound, element, particle, or method step, etc., is present in the composition or article or method, but does not exclude the presence of other compounds, catalysts, materials, particles, method steps, etc, even if the other such compounds, material, particles, method steps, etc., have the same function as what is named, unless expressly excluded in the claims.

As used herein, the term "alkyl" shall denote a hydrocarbon substituent. Alkyl groups suitable for use herein can be straight, branched, or cyclic, and can be saturated or unsaturated. The carbon units in the alkyl group is often included; for example $(C_{1-6})$alkyl. Alkyl groups suitable for use herein include any $(C_{1-20})$, $(C_{1-12})$, $(C_{1-5})$, or $(C_{1-3})$ alkyl groups. In various embodiments, the alkyl can be a $C_{1-5}$ straight chain alkyl group. In still other embodiments, the alkyl can be a $C_{1-3}$ straight chain alkyl group. Specific examples of suitable alkyl groups include, but are not limited to, methyl, ethyl, n-propyl, isopropyl, n-butyl, isobutyl, sec-butyl, tert-butyl, pentyl, hexyl, octyl, decyl, dodecyl, cyclopentyl, and cyclohexyl groups. As used herein, the term "alkylene" shall mean a bivalent alkyl radical.

"Cycloalkyl" means a cyclic alkyl group having at least three carbon units. The carbon units in the cycloalkyl group is often included; for example $(C_{3-8})$cycloalkyl. Nonlimiting examples of cycloalkyl include cyclopropyl, cyclobutyl, cyclohexyl, cycloheptyl, and the like.

"Bicycloalkyl" means a ring system with two fused cycloalkyl rings. The bicycloalkyl ring system may be bridged or unbridged. The number of carbon units may be specified (e.g., $C_{6-10}$).

"Heterocyclyl" means a nonaromatic ring system containing one or more heteroatoms including N, O, and S. The number and kind of heteroatoms present may be specified. The size of the ring may also be specified. An example includes a 6- to 8-membered heterocyclyl containing 2 N heteroatoms. Examples of a heterocyclyl groups include piperadinyl, piperazinyl, and pyrrolidine.

"Amorphous" means that the material will not exhibit a melting point by dynamic scanning calorimetry ("DSC") after a scanning sequence consisting of cooling from the melt state (i.e. generally in the area of 280-300 °C and heating under typical ramp (both cooling and heating) rates of 20 °C/minute under a nitrogen atmosphere with the temperature range covered by the scans is from −50 °C to 300 °C.

"Semi-crystalline" means that the material exhibits a melting point as detectable by DSC after a scanning sequence consisting of cooling from the melt state (i.e. generally in the area of 280-300 °C) and heating under typical ramp (both cooling and heating) rates of 20 °C/minute under a nitrogen atmosphere with the temperature range covered by the scans is from −50 °C to 300 °C "Microcrystalline" means that the material exhibits a melting point at as detected by DSC but typically remains visually clear due to small crystalline domain sizes or that coupled with small differences in the refractive indices between amorphous and crystalline domains.

Alkane dioic acids; such as heptanedioic acid, octanedioic acid, nonanedioic acid, decanedioic acid, undecanedioic acid, dodecanedioic acid, tridecanedioic acid, hexadecanedioic acid, octadecanedioic acid, or eicosanedioic acid; can be have terminal carboxylic acids or internal carboxylic acids. For example, heptane dioic acid can be 1,7 heptane dioic acid, 1,6-heptane dioic acid, 1,5-heptane dioic acid, 1,4-heptane dioic acid, 2,6-heptane dioic acid, 3,5-heptane dioic acid, and the like. The alkane group can be unbranched or branched. For example, heptane dioic acid can be 2-methylhexanedioic acid, 3-methylhexanedioic acid, 2-ethylpendanedioic acid, and the like.

"Epoxy silane" means a chemical that has at least one silane moiety and an epoxy moiety connected by a linker. Nonlimiting examples of epoxy silanes are as follows:

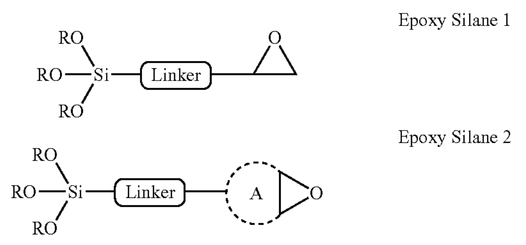

Epoxy Silane 1

Epoxy Silane 2

R is $(C_{1-12})$alkyl;

A group is a $(C_{3-8})$cycloalkyl ring system;

Linker is a bond, an $(C_{1-20})$alkyl, $(C_{3-8})$cycloalkyl, hetero$(C_{2-20})$alkyl, or aryl.

The epoxy group of the epoxy silane can react with the polyesteramides to incorporate the epoxy silane in the polymer. The epoxy silane can be incorporated in the reaction to synthesize the polymer, the epoxy silane can be incorporated as an additive after the polymer is synthesized, or the epoxy silane can be incorporated on the surface of articles formed from the polymer. By incorporating the epoxy silane into the polymer, the properties of the polymer can be modified. For example, the epoxy silane can be used to improve the adhesion of the polymer to various surfaces (e.g., glass surfaces). Specific examples of epoxy silanes include trimethoxy[2-7-oxabicyclo[4.1.0]hept-3-yl]ethyl]silane, triethoxy[2-7-oxabicyclo[4.1.0]hept-3-yl]ethyl]silane, (3-glycidyloxypropyl)trimethoxysilane, (3-glycidyloxypropyl)trimethoxysilane, diethoxy(3-glycidyloxypropyl)methylsilane, 3-glycidoxypropyldimethylethoxysilane, 5,6-epoxyhexyltriethoxysilane, and the like.

"Isocyanate silane" means a chemical that has at least one silane moiety and an isocyanate moiety connected by a linker. Nonlimiting examples of isocyanate silanes are as follows:

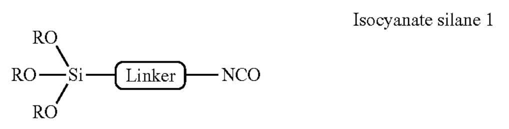

Isocyanate silane 1

R is $(C_{1-12})$alkyl;

Linker is a bond, an $(C_{1-20})$alkyl, $(C_{3-8})$cycloalkyl, hetero $(C_{2-20})$alkyl, or aryl.

The isocyanate group of the isocyanate silane can react with the polyesteramides to incorporate the isocyanate silane in the polymer. The isocyanate silane can be incorporated in the reaction to synthesize the polymer, the isocyanate silane can be incorporated as an additive after the polymer is synthesized, or the isocyanate silane can be incorporated on the surface of articles formed from the polymer. By incorporating the isocyanate silane into the polymer, the properties of the polymer can be modified. For example, the isocyanate silane can be used to improve the adhesion of the polymer to various surfaces (e.g., glass surfaces). Nonlimiting examples of isocyanate silanes include 3-isocyanotopropyltrimethoxysilane, 3-isocyanotopropyltriethoxysilane and the like.

Compositions of Matter

The present application discloses a polyesteramide comprising: (a) a diamine component comprising: 1 to 99 mole % of diamine residues derived from diamine which is a $CH_2((C_{3-8})$cycloalkyl-$NH_2)_2$; (b) a diol component comprising: 1 to 99 mole % of diol residues derived from a diol which is a $(C_{3-8})$cycloalkyl di($(C_{1-3})$alkanol); (c) a diacid component comprising: 10 to 100 mole % of diacid residues derived from a diacid which is chosen from $HO_2C—(C_{2-40})$alkylene-$CO_2H$, or $HO_2C—(C_{3-10})$cycloalkyl-$CO_2H$; wherein each cycloalkyl is unsubstituted or substituted by 1-4 $(C_{1-3})$alkyl, wherein the total mole % of the diacid component is 100 mole %, and wherein the total mole % of the combined diol and diamine component is 100 mole %.

In one embodiment, the polyesteramide comprises: (a) a diamine component comprising: 1 to 99 mole % of diamine residues derived from diamine which is a $CH_2((C_{3-8})$cycloalkyl-$NH_2)_2$; (b) a diol component comprising: 1 to 99 mole % of diol residues derived from a diol which is a $(C_{3-8})$cycloalkyl di($(C_{1-3})$alkanol); (c) a diacid component comprising: 10 to 100 mole % of diacid residues derived from a diacid which is chosen from $HO_2C—(C_{2-20})$alkylene-$CO_2H$, or $HO_2C—(C_{3-10})$cycloalkyl-$CO_2H$; wherein each cycloalkyl is unsubstituted or substituted by 1-4 $(C_{1-3})$alkyl, wherein the total mole % of the diacid component is 100 mole %, and wherein the total mole % of the combined diol and diamine component is 100 mole %.

In one embodiment, the diol is chosen from cyclohexane-1,4-dimethanol, cyclohexane-1,3-dimethanol, cyclopentane-1,3-dimethanol, cyclobutane-1,3-dimethanol, cycloheptane-1,4-dimethanol, or cyclohexane-1,4-diethanol. In one class of this embodiment, the diol residues are present at from about 15 mole % to about 75 mole %.

In one class of this embodiment, the diol is chosen from cyclohexane-1,4-dimethanol or cyclohexane-1,3-dimethanol. In subclass of this class, the diol residues are present at from about 15 mole % to about 75 mole %.

In one class of this embodiment, the diol is cyclohexane-1,4-dimethanol. In one class of this embodiment, the diol is cyclohexane-1,3-dimethanol. In one subclass of this class, the diol residues are present at from about 15 mole % to about 75 mole %.

In one class of this embodiment, the diol is cyclobutane-1,3-dimethanol. In one subclass of this class, the diol residues are present at from about 15 mole % to about 75 mole %.

In one class of this embodiment, the diol is cycloheptane-1,4-dimethanol. In one subclass of this class, the diol residues are present at from about 15 mole % to about 75 mole %.

In one class of this embodiment, the diol is cyclohexane-1,4-diethanol. In one subclass of this class, the diol residues are present at from about 15 mole % to about 75 mole %.

In one embodiment, the diol residues are present at from about 5 mole % to about 90 mole %. In one embodiment, the diol residues are present at from about 10 mole % to about 80 mole %. In one embodiment, the diol residues are present at from about 10 mole % to about 90 mole %. In one embodiment, the diol residues are present at from about 15 mole % to about 30 mole %. In one embodiment, the diol residues are present at from about 30 mole % to about 50 mole %. In one embodiment, the diol residues are present at from about 50 mole % to about 70 mole %.

In one embodiment, the diol component further comprises an alkylene glycol residue derived from $H—[—O—CH_2—CH_2—(CH_2)_n—]_m—OH$, wherein n is an integer from 0 to 2; and m is an integer from 2 to 50. In one class of this embodiment, the alkylene glycol residues are present from 0.01 to 10 mole %. In one class of this embodiment, the alkylene glycol residues are present from 0.01 to 5 mole %. In one class of this embodiment, the alkylene glycol residues are present from 0.01 to 1 mole %. In one class of this embodiment, the alkylene glycol residues are present from 0.01 to 0.5 mole %. In one class of this embodiment, the alkylene glycol residues are present from 0.01 to 0.1 mole %.

In one embodiment, the diamine is chosen from 4,4'-methylenebis(2-methylcyclohexylamine), 4,4'-methylenebis(cyclohexylamine), 4,4'-methylenebis(3-methylcyclohexan-1-amine), 4,4'-methylenebis(2-methylcyclohexan-1-amine), 4-((4-aminocyclohexyl)methyl)-2-methylcyclohexan-1-amine, or 4,4'-methylenebis(2,6-dimethylcyclohexan-1-amine). In one class of this embodiment, the diamine residues are present at from about 10 mole % to about 85 mole %.

In one class of this embodiment, the diamine is chosen from 4,4'-methylenebis(2-methylcyclohexylamine) or 4,4'-methylenebis(cyclohexylamine). In one subclass of this class, the diamine residues are present at from about 10 mole % to about 85 mole %.

In one class of this embodiment, the diamine is 4,4'-methylenebis(2-methylcyclohexylamine). In one subclass of this class, the diamine residues are present at from about 10 mole % to about 85 mole %.

In one class of this embodiment, the diamine is 4,4'-methylenebis(cyclohexylamine). In one subclass of this class, the diamine residues are present at from about 10 mole % to about 85 mole %.

In one class of this embodiment, the diamine is 4,4'-methylenebis(3-methylcyclohexan-1-amine). In one subclass of this class, the diamine residues are present at from about 10 mole % to about 85 mole %.

In one class of this embodiment, the diamine is 4,4'-methylenebis(2-methylcyclohexan-1-amine). In one subclass of this class, the diamine residues are present at from about 10 mole % to about 85 mole %.

In one class of this embodiment, the diamine is 4-((4-aminocyclohexyl)methyl)-2-methylcyclohexan-1-amine. In one subclass of this class, the diamine residues are present at from about 10 mole % to about 85 mole %.

In one class of this embodiment, the diamine is 4,4'-methylenebis(2,6-dimethylcyclohexan-1-amine). In one subclass of this class, the diamine residues are present at from about 10 mole % to about 85 mole %.

In one embodiment, the diamine residues are present at from about 5 mole % to about 90 mole %. In one embodiment, the diamine residues are present at from about 10 mole % to about 80 mole %. In one embodiment, the diamine residues are present at from about 10 mole % to about 85 mole %. In one embodiment, the diamine residues are present at from about 15 mole % to about 30 mole %. In one embodiment, the diamine residues are present at from about 30 mole % to about 50 mole %. In one embodiment, the diamine residues are present at from about 50 mole % to about 70 mole %.

In one embodiment, the $HO_2C—(C_{2-40})$alkylene-$CO_2H$ is present from about 40 mole % to about 70 mole % and the $HO_2C—(C_{3-10})$cycloalkyl-$CO_2H$ is present from about 30 mole % to about 60 mole %. In one embodiment, the $HO_2C$—$(C_{2-40})$alkylene-$CO_2H$ is present from about 50 mole % to about 60 mole % and the $HO_2C$—$(C_{3-10})$cycloalkyl-$CO_2H$ is present from about 40 mole % to about 50 mole %.

In one embodiment, the $HO_2C$—$(C_{2-20})$alkylene-$CO_2H$ is present from about 40 mole % to about 70 mole % and the $HO_2C$—$(C_{3-10})$cycloalkyl-$CO_2H$ is present from about 30 mole % to about 60 mole %. In one embodiment, the $HO_2C$—$(C_{2-20})$alkylene-$CO_2H$ is present from about 50 mole % to about 60 mole % and the $HO_2C$—$(C_{3-10})$cycloalkyl-$CO_2H$ is present from about 40 mole % to about 50 mole %.

In one embodiment, the diacid is $HO_2C$—$(C_{2-20})$alkylene-$CO_2H$. In one class of this embodiment, the diamine is chosen from 4,4'-methylenebis(2-methylcyclohexylamine) or 4,4'-methylenebis(cyclohexylamine). In one subclass of this class, the diol is cyclohexane-1,4-dimethanol.

In one embodiment, the diacid is $HO_2C$—$(C_{2-40})$alkylene-$CO_2H$. In one class of this embodiment, the diamine is chosen from 4,4'-methylenebis(2-methylcyclohexylamine) or 4,4'-methylenebis(cyclohexylamine). In one subclass of this class, the diol is cyclohexane-1,4-dimethanol.

In one embodiment, the diacid is $HO_2C$—$(C_{3-10})$cycloalkyl-$CO_2H$. In one class of this embodiment, the diamine is chosen from 4,4'-methylenebis(2-methylcyclohexylamine) or 4,4'-methylenebis(cyclohexylamine). In one subclass of this class, the diol is cyclohexane-1,4-dimethanol.

In one embodiment, the diacid is chosen from succinic acid, glutaric acid, adipic acid, heptanedioic acid, octanedioic acid, nonanedioic acid (e.g, azelaic acid), decanedioic acid (e.g, sebacic acid), undecanedioic acid, dodecanedioic acid, tridecanedioic acid, hexadecanedioic acid, octadecanedioic acid, eicosanedioic acid, 9-[(Z)-non-3-enyl]-10-octylnonadecanedioic acid (dimer acid), 9-nonyl-10-octylnonadecanedioic acid (hydrogenated dimer acid, Pripol 1009), cyclobutane-1,3-dicarboxylic acid, cyclopentane-1,3-dicarboxylic acid, cyclohexane-1,4-dicarboxylic acid, cyclohexane-1,3-dicarboxylic acid, cycloheptane-1,4-dicarboxylic acid, cyclooctane-1,5-dicarboxylic acid, or cyclooctane-1,4-dicarboxylic acid. In one class of this embodiment, the diamine is chosen from 4,4'-methylenebis(2-methylcyclohexylamine) or 4,4'-methylenebis(cyclohexylamine). In one subclass of this class, the diol is cyclohexane-1,4-dimethanol.

In one embodiment, the diacid is chosen from adipic acid, 1,12-dodecanedioic acid, azelaic acid, sebacic acid, 1,18-octadecanedioic acid, 9-nonyl-10-octylnonadecanedioic acid (hydrogenated dimer acid, Pripol 1009), cyclohexane-1,3-dicarboxylic acid or cyclohexane-1,4-dicarboxylic acid. In one class of this embodiment, the diamine is chosen from 4,4'-methylenebis(2-methylcyclohexylamine) or 4,4'-methylenebis(cyclohexylamine). In one subclass of this class, the diol is cyclohexane-1,4-dimethanol. In one sub-subclass of this subclass, the adipic acid or 1,12-dodecanedioic acid is present from about 40 mole % to about 70 mole % and the cyclohexane-1,3-dicarboxylic acid is present from about 30 mole % to about 60 mole %. In one sub-subclass of this subclass, the adipic acid or 1,12-dodecanedioic acid is present from about 50 mole % to about 60 mole % and the cyclohexane-1,3-dicarboxylic acid is present from about 40 mole % to about 50 mole %.

In one embodiment, the diacid is chosen from succinic acid, glutaric acid, adipic acid, heptanedioic acid, octanedioic acid, nonanedioic acid (e.g., azelaic acid), decanedioic acid (e.g, sebacic acid), undecanedioic acid, dodecanedioic acid, tridecanedioic acid, hexadecanedioic acid, octadecanedioic acid, or eicosanedioic acid. In one class of this embodiment, the diamine is chosen from 4,4'-methylenebis(2-methylcyclohexylamine) or 4,4'-methylenebis(cyclohexylamine). In one subclass of this class, the diol is cyclohexane-1,4-dimethanol.

In one embodiment, the diacid is chosen from adipic acid, or 1,12-dodecanedioic acid. In one class of this embodiment, the diamine is chosen from 4,4'-methylenebis(2-methylcyclohexylamine) or 4,4'-methylenebis(cyclohexylamine). In one subclass of this class, the diol is cyclohexane-1,4-dimethanol.

In one embodiment, the diacid is chosen from cyclobutane-1,3-dicarboxylic acid, cyclopentane-1,3-dicarboxylic acid, cyclohexane-1,4-dicarboxylic acid, cyclohexane-1,3-dicarboxylic acid, cycloheptane-1,4-dicarboxylic acid, cyclooctane-1,5-dicarboxylic acid, or cyclooctane-1,4-dicarboxylic acid. In one class of this embodiment, the diamine is chosen from 4,4'-methylenebis(2-methylcyclohexylamine) or 4,4'-methylenebis(cyclohexylamine). In one subclass of this class, the diol is cyclohexane-1,4-dimethanol.

In one embodiment, the diacid is cyclohexane-1,3-dicarboxylic acid. In one class of this embodiment, the diamine is chosen from 4,4'-methylenebis(2-methylcyclohexylamine) or 4,4'-methylenebis(cyclohexylamine). In one subclass of this class, the diol is cyclohexane-1,4-dimethanol.

In one embodiment, the diacid is 9-nonyl-10-octylnonadecanedioic acid (hydrogenated dimer acid, Pripol 1009). In one class of this embodiment, the diamine is chosen from 4,4'-methylenebis(2-methylcyclohexylamine) or 4,4'-methylenebis(cyclohexylamine). In one subclass of this class, the diol is cyclohexane-1,4-dimethanol.

In one embodiment, the polyesteramide further comprises branching agent residues derived from a compound chosen from trimellitic acid, trimethylolpropane, trimethylolethane, glycerol, pentaerythritol, citric acid, tartaric acid, 3-hydroxyglutaric acid, glycerineerythritol, threitol, dipentaerythritol, sorbitol, trimellitic anhydride, pyromelltic dianhydride, trimesic acid, or dimethylol propionic acid.

In one class of this embodiment, the branching agent residues are present from about 0.01 to about 10 weight % based on the total weight % of the polyesteramide. In one class of this embodiment, the branching agent residues are present from about 0.001 to about 10 weight % based on the total weight % of the polyesteramide.

In one class of this embodiment, the branching agent residues are derived from trimellitic acid. In one class of this embodiment, the branching agent residues are derived from trimethylolpropane. In one class of this embodiment, the branching agent residues are derived from trimethylolethane. In one class of this embodiment, the branching agent residues are derived from glycerol. In one class of this embodiment, the branching agent residues are derived from pentaerythritol. In one class of this embodiment, the branching agent residues are derived from citric acid. In one class of this embodiment, the branching agent residues are derived from tartaric acid. In one class of this embodiment, the branching agent residues are derived from 3-hydroxyglutaric acid. In one class of this embodiment, the branching agent residues are derived from glycerineerythritol. In one class of this embodiment, the branching agent residues are derived from threitol. In one class of this embodiment, the branching agent residues are derived from dipentaerythritol. In one class of this embodiment, the branching agent residues are derived from sorbitol. In one class of this embodiment, the branching agent residues are derived from trimellitic anhydride. In one class of this embodiment, the branching agent residues are derived from pyromelltic dianhydride. In one class of this embodiment, the branching agent residues are derived from trimesic acid. In one class of this embodiment, the branching agent residues are derived from dimethylol propionic acid.

The branching monomer may be added to the polyesteramide reaction mixture or blended with the polyesteramide in the form of a concentrate as described, for example, in U.S. Pat. Nos. 5,654,347 and 5,696,176, whose disclosure regarding branching monomers for polyesters is incorporated herein by reference.

In one embodiment, the polyesteramide has a glass transition temperature of from about −30 °C to about 200 °C. In one class of this embodiment, the polyesteramide has a glass transition temperature of from about −30 °C to about 20 °C. In one class of this embodiment, the polyesteramide has a glass transition temperature of from about −20 °C to about 20 °C. In one class of this embodiment, the polyesteramide has a glass transition temperature of from about −20 °C to about 0 °C. In one class of this embodiment, the polyesteramide has a glass transition temperature of from about 0 °C to about 200 ° C. In one class of this embodiment, the polyesteramide has a glass transition temperature of from about 0 °C to about 20 °C. In one class of this embodiment, the polyesteramide has a glass transition temperature of from about 20 °C to about 90 °C. In one class of this embodiment, the polyesteramide has a glass transition temperature of from about 90 °C to about 130 °C. In one class of this embodiment, the polyesteramide has a glass transition temperature of from about 130 °C to about 200 °C. In one class of this embodiment, the polyesteramide has a glass transition temperature of from about 90 °C to about 190 °C.

In one embodiment, the polyesteramide has an inherent viscosity of from about 0.3 dL/g to about 2.0 dL/g as determined according to ASTM D2857-70. In one class of this embodiment, the polyesteramide has an inherent viscosity of from about 0.3 dL/g to about 1.4 dL/g as determined according to ASTM D2857-70. In one class of this embodiment, the polyesteramide has an inherent viscosity of from about 0.4 dL/g to about 0.8 dL/g as determined according to ASTM D2857-70. In one class of this embodiment, the polyesteramide has an inherent viscosity of from about 0.4 dL/g to about 0.5 dL/g as determined according to ASTM D2857-70. In one class of this embodiment, the polyesteramide has an inherent viscosity of from about 0.5 dL/g to about 0.6 dL/g as determined according to ASTM D2857-70. In one class of this embodiment, the polyesteramide has an inherent viscosity of from about 0.6 dL/g to about 0.7 dL/g as determined according to ASTM D2857-70. In one class of this embodiment, the polyesteramide has an inherent viscosity of from about 0.7 dL/g to about 0.8 dL/g as determined according to ASTM D2857-70. In one class of this embodiment, the polyesteramide has an inherent viscosity of from about 0.8 dL/g to about 1.4 dL/g as determined according to ASTM D2857-70. In one class of this embodiment, the polyesteramide has an inherent viscosity of from about 0.9 dL/g to about 1.4 dL/g as determined according to ASTM D2857-70. In one class of this embodiment, the polyesteramide has an inherent viscosity of from about 1.0 dL/g to about 1.4 dL/g as determined according to ASTM D2857-70.

In one embodiment, the polyesteramide is amorphous or semicrystalline. In one class of this embodiment, the polyesteramide is amorphous. In one class of this embodiment, the polyesteramide is semicrystalline.

In one embodiment, the melt viscosity of the polyester(s) useful in the invention is less than 30,000 poise as measured a 1 radian/second on a rotary melt rheometer at 280 °C. In another embodiment, the melt viscosity of the polyester(s) useful in the invention is less than 20,000 poise as measured a 1 radian/second on a rotary melt rheometer at 280 °C. In one embodiment, the polyesteramide has a melt viscosity of less than 10,000 poise as measured at 1 radian/second on a rotary melt rheometer at 280 °C. In one embodiment, the polyesteramide has a melt viscosity of less than 9,000 poise as measured at 1 radian/second on a rotary melt rheometer at 280 °C. In one embodiment, the polyesteramide has a melt viscosity of less than 8,000 poise as measured at 1 radian/second on a rotary melt rheometer at 280 °C. In one embodiment, the polyesteramide has a melt viscosity of less than 6,000 poise as measured at 1 radian/second on a rotary melt rheometer at 280 °C. In one embodiment, the polyesteramide has a melt viscosity of less than 6,000 poise as measured at 1 radian/second on a rotary melt rheometer at 280 °C. Viscosity at rad/sec is related to processability. Typical polymers have viscosities of less than 10,000 poise as measured at 1 radian/second when measured at their processing temperature.

The present application also discloses a polyesteramide comprising: (a) a diamine component comprising: 1 to 99 mole % of diamine residues derived from a diamine chosen from $(C_{2-20})$alkyl diamine, $CH_2((C_{3-8})$cycloalkyl-$NH_2)_2$, $H_2N$—$((C_{1-3})$alkyl$)_{0-1}$-$(C_{3-8})$cycloalkyl-$((C_{1-3})$alkyl$)_{0-1}$-$NH_2$, 6- to 8-membered heterocycyl containing 2 nitrogen atoms, or $H_2N$—$((C_{1-3})$alkyl$)_{0-1}$-$(C_{6-10})$bicyloalkyl-$((C_{1-3})$alkyl$)_{0-1}$-$NH_2$ wherein the bicycyloalkyl is unbridged or bridged; (b) a diol component comprising: 1 to 99 mole % of diol residues derived from a diol which is $(C_{3-8})$cycloalkyl diol; (c) a diacid component comprising: 10 to 100 mole % of diacid residues derived from a diacid chosen from $HO_2C$—$(C_{2-40})$alkylene-$CO_2H$, or $HO_2C$—$(C_{3-10})$cycloalkyl-$CO_2H$; wherein each cycloalkyl is unsubstituted or substituted by 1-4 $(C_{1-3})$alkyl, wherein the total mole % of the diacid component is 100 mole %, wherein the total mole % of the combined diol and diamine component is 100 mole %.

In one embodiment, the polyesteramide comprises: (a) a diamine component comprising: 1 to 99 mole % of diamine residues derived from a diamine chosen from $(C_{2-20})$alkyl diamine, $CH_2((C_{3-8})$cycloalkyl-$NH_2)_2$, $H_2N$—$((C_{1-3})$alkyl$)_{0-1}$-$(C_{3-8})$cycloalkyl-$((C_{1-3})$alkyl$)_{0-1}$-$NH_2$, 6- to 8-membered heterocycyl containing 2 nitrogen atoms, or $H_2N$—$((C_{1-3})$alkyl$)_{0-1}$-$(C_{6-10})$bicyloalkyl-$((C_{1-3})$alkyl$)_{0-1}$-$NH_2$ wherein the bicycyloalkyl is unbridged or bridged; (b) a diol component comprising: 1 to 99 mole % of diol residues derived from a diol which is $(C_{3-8})$cycloalkyl diol; (c) a diacid component comprising: 10 to 100 mole % of diacid residues derived from a diacid chosen from $HO_2C$—$(C_{2-20})$alkylene-$CO_2H$, or $HO_2C$—$(C_{3-10})$cycloalkyl-$CO_2H$; wherein each cycloalkyl is unsubstituted or substituted by 1-4 $(C_{1-3})$alkyl, wherein the total mole % of the diacid component is 100 mole %, wherein the total mole % of the combined diol and diamine component is 100 mole %.

In one embodiment, the diol is chosen from cyclobutane-1,3-diol, 2,4-dimethylcyclobutane-1,3-diol, 2,4-diethylcyclobutane-1,3-diol, 2,2-dimethylcyclobutane-1,3-diol, or 2,2,4,4-tetramethylcyclobutane-1,3-diol. In one class of this embodiment, the diol residues are present at from about 15 mole % to about 65 mole %.

In one class of this embodiment, the diol is cyclobutane-1,3-diol. In one subclass of this class, the diol residues are present at from about 15 mole % to about 65 mole %.

In one class of this embodiment, the diol is 2,4-dimethylcyclobutane-1,3-diol. In one subclass of this class, the diol residues are present at from about 15 mole % to about 65 mole %.

In one class of this embodiment, the diol is 2,4-diethylcyclobutane-1,3-diol. In one subclass of this class, the diol residues are present at from about 15 mole % to about 65 mole %.

In one class of this embodiment, the diol is 2-dimethylcyclobutane-1,3-diol. In one subclass of this class, the diol residues are present at from about 15 mole % to about 65 mole %.

In one class of this embodiment, the diol is 2,2,4,4-tetramethylcyclobutane-1,3-diol. In one subclass of this class, the diol residues are present at from about 15 mole % to about 65 mole %.

In one embodiment, the diol residues are present at from about 5 mole % to about 90 mole %. In one embodiment, the diol residues are present at from about 10 mole % to about 80 mole %. In one embodiment, the diol residues are present at from about 10 mole % to about 90 mole %. In one embodiment, the diol residues are present at from about 15 mole % to about 30 mole %. In one embodiment, the diol residues are present at from about 30 mole % to about 50 mole %. In one embodiment, the diol residues are present at from about 50 mole % to about 70 mole %. In one embodiment, the diol residues are present at from about 15 mole % to about 65 mole %.

In one embodiment, the diol component further comprises an alkylene glycol residue derived from $H—[—O—CH_2—CH_2—(CH_2)_n—]_m—OH$, wherein n is an integer from 0 to 2; and m is an integer from 2 to 50. In one class of this embodiment, the alkylene glycol residues are present from 0.01 to 10 mole %. In one class of this embodiment, the alkylene glycol residues are present from 0.01 to 5 mole %. In one class of this embodiment, the alkylene glycol residues are present from 0.01 to 1 mole %. In one class of this embodiment, the alkylene glycol residues are present from 0.01 to 0.5 mole %. In one class of this embodiment, the alkylene glycol residues are present from 0.01 to 0.1 mole %.

In one embodiment, the diamine is $(C_{2-20})$alkyl diamine. In one class of this embodiment, the diol residues are present at from about 35 mole % to about 85 mole %.

In one embodiment, the diamine is $CH_2((C_{3-8})$cycloalkyl-$NH_2)_2$. In one class of this embodiment, the diol residues are present at from about 35 mole % to about 85 mole %.

In one embodiment, the diamine is $H_2N—((C_{1-3})$alkyl$)_{0-1}$-$(C_{3-8})$cycloalkyl-$((C_{1-3})$alkyl$)_{0-1}$-$NH_2$. In one class of this embodiment, the diol residues are present at from about 35 mole % to about 85 mole %.

In one embodiment, the diamine is 6- to 8-membered heterocycyl containing 2 nitrogen atoms. In one class of this embodiment, the diol residues are present at from about 35 mole % to about 85 mole %.

In one embodiment, the diamine is $H_2N—((C_{1-3})$alkyl$)_{0-1}$-$(C_{6-10})$bicyloalkyl-$((C_{1-3})$alkyl$)_{0-1}$-$NH_2$ wherein the bicycyloalkyl is unbridged or bridged. In one class of this embodiment, the diol residues are present at from about 35 mole % to about 85 mole %.

In one embodiment, the diamine is chosen from 4,4'-methylenebis(2-methylcyclohexylamine), 4,4'-methylenebis(cyclohexylamine), 1,6-hexanediamine, 2,4,5-trimethyl-1,6-hexanediamine, 5-amino-1,3,3-trimethylcyclohexanemethylamine, 1,4-bis(aminomethyl)cyclohexane, or 2,2,4,4-tetramethyl-1,3-cyclobutanediamine. In one class of this embodiment, the diol residues are present at from about 35 mole % to about 85 mole %.

In one class of this embodiment, the diamine is chosen from 4,4'-methylenebis(2-methylcyclohexylamine), or 4,4'-methylenebis(cyclohexylamine). In one subclass of this class, the diol residues are present at from about 35 mole % to about 85 mole %.

In one class of this embodiment, the diamine is 4,4'-methylenebis(2-methylcyclohexylamine). In one subclass of this class, the diol residues are present at from about 35 mole % to about 85 mole %.

In one class of this embodiment, the diamine is 4,4'-methylenebis(cyclohexylamine). In one subclass of this class, the diol residues are present at from about 35 mole % to about 85 mole %.

In one class of this embodiment, the diamine is 1,6-hexanediamine. In one subclass of this class, the diol residues are present at from about 35 mole % to about 85 mole %.

In one class of this embodiment, the diamine is 2,4,5-trimethyl-1,6-hexanediamine. In one subclass of this class, the diol residues are present at from about 35 mole % to about 85 mole %.

In one class of this embodiment, the diamine is 5-amino-1,3,3-trimethylcyclohexanemethylamine. In one subclass of this class, the diol residues are present at from about 35 mole % to about 85 mole %.

In one class of this embodiment, the diamine is 1,4-bis(aminomethyl)cyclohexane. In one subclass of this class, the diol residues are present at from about 35 mole % to about 85 mole %.

In one class of this embodiment, the diamine is 2,2,4,4-tetramethyl-1,3-cyclobutanediamine. In one subclass of this class, the diol residues are present at from about 35 mole % to about 85 mole %.

In one embodiment, the diamine residues are present at from about 5 mole % to about 90 mole %. In one embodiment, the diamine residues are present at from about 10 mole % to about 80 mole %. In one embodiment, the diamine residues are present at from about 10 mole % to about 90 mole %. In one embodiment, the diamine residues are present at from about 15 mole % to about 30 mole %. In one embodiment, the diamine residues are present at from about 30 mole % to about 50 mole %. In one embodiment, the diamine residues are present at from about 50 mole % to about 70 mole %. In one embodiment, the diamine residues are present at from about 15 mole % to about 65 mole %. In one embodiment, the diamine residues are present at from about 35 mole % to about 85 mole %.

In one embodiment, the $HO_2C—(C_{2-20})$alkylene-$CO_2H$ is present from about 40 mole % to about 70 mole % and the $HO_2C—(C_{3-10})$cycloalkyl-$CO_2H$ is present from about 30 mole % to about 60 mole %. In one embodiment, the $HO_2C—(C_{2-40})$alkylene-$CO_2H$ is present from about 50 mole % to about 60 mole % and the $HO_2C—(C_{3-10})$cycloalkyl-$CO_2H$ is present from about 40 mole % to about 50 mole %.

In one embodiment, the $HO_2C—(C_{2-20})$alkylene-$CO_2H$ is present from about 40 mole % to about 70 mole % and the $HO_2C—(C_{3-10})$cycloalkyl-$CO_2H$ is present from about 30 mole % to about 60 mole %. In one embodiment, the $HO_2C—(C_{2-20})$alkylene-$CO_2H$ is present from about 50 mole % to about 60 mole % and the $HO_2C—(C_{3-10})$cycloalkyl-$CO_2H$ is present from about 40 mole % to about 50 mole %.

In one embodiment, the diacid is $HO_2C—(C_{2-40})$alkylene-$CO_2H$. In one class of this embodiment, the diamine is chosen from 4,4'-methylenebis(2-methylcyclohexylamine) or 4,4'-methylenebis(cyclohexylamine). In one subclass of this class, the diol is 2,2,4,4-tetramethylcyclobutane-1,3-diol.

In one embodiment, the diacid is $HO_2C—(C_{2-20})$alkylene-$CO_2H$. In one class of this embodiment, the diamine is chosen from 4,4'-methylenebis(2-methylcyclohexylamine) or 4,4'-methylenebis(cyclohexylamine). In one subclass of this class, the diol is 2,2,4,4-tetramethylcyclobutane-1,3-diol.

In one embodiment, the diacid is $HO_2C—(C_{3-10})$cycloalkyl-$CO_2H$. In one class of this embodiment, the diamine is chosen from 4,4'-methylenebis(2-methylcyclohexylamine) or 4,4'-methylenebis(cyclohexylamine). In one subclass of this class, the diol is 2,2,4,4-tetramethylcyclobutane-1,3-diol.

In one embodiment, the diacid is chosen from succinic acid, glutaric acid, adipic acid, heptanedioic acid, octanedioic acid, nonanedioic acid (e.g., azalaic acid), decanedioic acid (e.g., sebacic acid), undecanedioic acid, dodecanedioic acid, tridecanedioic acid, hexadecanedioic acid, octadecanedioic acid, eicosanedioic acid, 9-[(Z)-non-3-enyl]-10-octylnonadecanedioic acid (dimer acid), 9-nonyl-10-octylnonadecanedioic acid (hydrogenated dimer acid, Pripol 1009), cyclobutane-1,3-dicarboxylic acid, cyclopentane-1,3-dicarboxylic acid, cyclohexane-1,4-dicarboxylic acid, cyclohexane-1,3-dicarboxylic acid, cycloheptane-1,4-dicarboxylic acid, cyclooctane-1,5-dicarboxylic acid, or cyclooctane-1,4-dicarboxylic acid. In one class of this embodiment, the diamine is chosen from 4,4'-methylenebis(2-methylcyclohexylamine) or 4,4'-methylenebis(cyclohexylamine). In one subclass of this class, the diol is 2,2,4,4-tetramethylcyclobutane-1,3-diol.

In one embodiment, the diacid is chosen from adipic acid, 1,12-dodecanedioic acid, azelaic acid, sebacic acid, 1,18-octadecanedioic acid, 9-nonyl-10-octylnonadecanedioic acid (hydrogenated dimer acid, Pripol 1009), cyclohexane-1,3-dicarboxylic acid or cyclohexane-1,4-dicarboxylic acid. In one class of this embodiment, the diamine is chosen from 4,4'-methylenebis(2-methylcyclohexylamine) or 4,4'-methylenebis(cyclohexylamine). In one subclass of this class, the diol is 2,2,4,4-tetramethylcyclobutane-1,3-diol. In one sub-subclass of this subclass, the adipic acid or 1,12-dodecanedioic acid is present from about 40 mole % to about 70 mole % and the cyclohexane-1,3-dicarboxylic acid is present from about 30 mole % to about 60 mole %. In one sub-subclass of this subclass, the adipic acid or 1,12-dodecanedioic acid is present from about 50 mole % to about 60 mole % and the cyclohexane-1,3-dicarboxylic acid is present from about 40 mole % to about 50 mole %.

In one embodiment, the diacid is chosen from succinic acid, glutaric acid, adipic acid, heptanedioic acid, octanedioic acid, nonanedioic acid (e.g., azelaic acid), decanedioic acid (e.g., sebacic acid), undecanedioic acid, dodecanedioic acid, tridecanedioic acid, hexadecanedioic acid, octadecanedioic acid, or eicosanedioic acid. In one class of this embodiment, the diamine is chosen from 4,4'-methylenebis(2-methylcyclohexylamine) or 4,4'-methylenebis (cyclohexylamine). In one subclass of this class, the diol is 2,2,4,4-tetramethylcyclobutane-1,3-diol.

In one embodiment, the diacid is chosen from adipic acid, or 1,12-dodecanedioic acid. In one class of this embodiment, the diamine is chosen from 4,4'-methylenebis(2-methylcyclohexylamine) or 4,4'-methylenebis(cyclohexylamine). In one subclass of this class, the diol is 2,2,4,4-tetramethylcyclobutane-1,3-diol.

In one embodiment, the diacid is chosen from cyclobutane-1,3-dicarboxylic acid, cyclopentane-1,3-dicarboxylic acid, cyclohexane-1,4-dicarboxylic acid, cyclohexane-1,3-dicarboxylic acid, cycloheptane-1,4-dicarboxylic acid, cyclooctane-1,5-dicarboxylic acid, or cyclooctane-1,4-dicarboxylic acid. In one class of this embodiment, the diamine is chosen from 4,4'-methylenebis(2-methylcyclohexylamine) or 4,4'-methylenebis(cyclohexylamine). In one subclass of this class, the diol is 2,2,4,4-tetramethylcyclobutane-1,3-diol.

In one embodiment, the diacid is cyclohexane-1,3-dicarboxylic acid. In one class of this embodiment, the diamine is chosen from 4,4'-methylenebis(2-methylcyclohexylamine) or 4,4'-methylenebis(cyclohexylamine). In one subclass of this class, the diol is 2,2,4,4-tetramethylcyclobutane-1,3-diol.

In one embodiment, the diacid is 9-nonyl-10-octylnonadecanedioic acid (hydrogenated dimer acid, Pripol 1009). In one class of this embodiment, the diamine is chosen from 4,4'-methylenebis(2-methylcyclohexylamine) or 4,4'-methylenebis(cyclohexylamine). In one subclass of this class, the diol is 2,2,4,4-tetramethylcyclobutane-1,3-diol.

In one embodiment, the polyesteramide further comprises branching agent residues derived from a compound chosen from trimellitic acid, trimethylolpropane, trimethylolethane, glycerol, pentaerythritol, citric acid, tartaric acid, 3-hydroxyglutaric acid, glycerineerythritol, threitol, dipentaerythritol, sorbitol, trimellitic anhydride, pyromelltic dianhydride, trimesic acid, or dimethylol propionic acid.

In one class of this embodiment, the branching agent residues are present from about 0.001 to about 10 weight % based on the total weight of the polyesteramide. In one class of this embodiment, the branching agent residues are present from about 0.01 to about 10 weight % based on the total weight of the polyesteramide. In one class of this embodiment, the branching agent residues are present at from about 0.001 to about 5 weight % based on the total weight of the polyesteramide. In one class of this embodiment, the branching agent residues are present at from about 0.001 to about 1 weight % based on the total weight of the polyesteramide. In one class of this embodiment, the branching agent residues are present at from about 0.001 to about 0.05 weight % based on the total weight of the polyesteramide. In one class of this embodiment, the branching agent residues are present at from about 0.001 to about 0.01 weight % based on the total weight of the polyesteramide.

In one class of this embodiment, the branching agent residues are derived from trimellitic acid. In one class of this embodiment, the branching agent residues are derived from trimethylolpropane. In one class of this embodiment, the branching agent residues are derived from trimethylolethane. In one class of this embodiment, the branching agent residues are derived from glycerol. In one class of this embodiment, the branching agent residues are derived from pentaerythritol. In one class of this embodiment, the branching agent residues are derived from citric acid. In one class of this embodiment, the branching agent residues are derived from tartaric acid. In one class of this embodiment, the branching agent residues are derived from 3-hydroxyglutaric acid. In one class of this embodiment, the branching agent residues are derived from glycerine erythritol. In one class of this embodiment, the branching agent residues are derived from threitol. In one class of this embodiment, the branching agent residues are derived from dipentaerythritol.

In one class of this embodiment, the branching agent residues are derived from sorbitol. In one class of this embodiment, the branching agent residues are derived from trimellitic anhydride. In one class of this embodiment, the branching agent residues are derived from pyromelltic dianhydride. In one class of this embodiment, the branching agent residues are derived from trimesic acid. In one class of this embodiment, the branching agent residues are derived from dimethylol propionic acid.

The branching monomer may be added to the polyester reaction mixture or blended with the polyester in the form of a concentrate as described, for example, in U.S. Pat. Nos. 5,654,347 and 5,696,176, whose disclosure regarding branching monomers is incorporated herein by reference.

In one embodiment, the polyesteramide further comprises silane residues derived from an epoxy silane or an isocyanate silane. In one class of this embodiment, the silane residues are present at from about 0.001 to about 10 weight % based on the total weight of the polyesteramide. In one class of this embodiment, the silane residues are present at from about 0.01 to about 10 weight % based on the total weight of the polyesteramide. In one class of this embodiment, the silane residues are present at from about 0.001 to about 5 weight % based on the total weight of the polyesteramide. In one class of this embodiment, the silane residues are present at from about 0.001 to about 1 weight % based on the total weight of the polyesteramide. In one class of this embodiment, the silane residues are present at from about 0.001 to about 0.05 weight % based on the total weight of the polyesteramide. In one class of this embodiment, the silane residues are present at from about 0.001 to about 0.01 weight % based on the total weight of the polyesteramide.

In one embodiment, the polyesteramide has a glass transition temperature of from about 0 °C to about 200 °C In one class of this embodiment, the polyesteramide has a glass transition temperature of from about 0 °C to about 20 °C. In one class of this embodiment, the polyesteramide has a glass transition temperature of from about 20 °C to about 90 °C. In one class of this embodiment, the polyesteramide has a glass transition temperature of from about 90 °C. to about 130 °C. In one class of this embodiment, the polyesteramide has a glass transition temperature of from about 130 °C. to about 200 °C. In one class of this embodiment, the polyesteramide has a glass transition temperature of from about 90 °C to about 190 °C.

In one embodiment, the polyesteramide has an inherent viscosity of from about 0.3 dL/g to about 2.0 dL/g as determined according to ASTM D2857-70. In one class of this embodiment, the polyesteramide has an inherent viscosity of from about 0.3 dL/g to about 1.4 dL/g as determined according to ASTM D2857-70. In one class of this embodiment, the polyesteramide has an inherent viscosity of from about 0.4 dL/g to about 0.8 dL/g as determined according to ASTM D2857-70. In one class of this embodiment, the polyesteramide has an inherent viscosity of from about 0.4 dL/g to about 0.5 dL/g as determined according to ASTM D2857-70. In one class of this embodiment, the polyesteramide has an inherent viscosity of from about 0.5 dL/g to about 0.6 dL/g as determined according to ASTM D2857-70. In one class of this embodiment, the polyesteramide has an inherent viscosity of from about 0.6 dL/g to about 0.7 dL/g as determined according to ASTM D2857-70. In one class of this embodiment, the polyesteramide has an inherent viscosity of from about 0.7 dL/g to about 0.8 dL/g as determined according to ASTM D2857-70. In one class of this embodiment, the polyesteramide has an inherent viscosity of from about 0.8 dL/g to about 1.4 dL/g as determined according to ASTM D2857-70. In one class of this embodiment, the polyesteramide has an inherent viscosity of from about 0.9 dL/g to about 1.4 dL/g as determined according to ASTM D2857-70. In one class of this embodiment, the polyesteramide has an inherent viscosity of from about 1.0 dL/g to about 1.4 dL/g as determined according to ASTM D2857-70.

In one embodiment, the polyesteramide is amorphous or semicrystalline. In one class of this embodiment, the polyesteramide is amorphous. In one class of this embodiment, the polyesteramide is semicrystalline.

In one embodiment, the melt viscosity of the polyester(s) useful in the invention is less than 30,000 poise as measured a 1 radian/second on a rotary melt rheometer at 280 °C. In another embodiment, the melt viscosity of the polyester(s) useful in the invention is less than 20,000 poise as measured a 1 radian/second on a rotary melt rheometer at 280 °C. In one embodiment, the polyesteramide has a melt viscosity of less than 10,000 poise as measured at 1 radian/second on a rotary melt rheometer at 280 °C. In one embodiment, the polyesteramide has a melt viscosity of less than 9,000 poise as measured at 1 radian/second on a rotary melt rheometer at 280 °C. In one embodiment, the polyesteramide has a melt viscosity of less than 8,000 poise as measured at 1 radian/second on a rotary melt rheometer at 280 °C. In one embodiment, the polyesteramide has a melt viscosity of less than 6,000 poise as measured at 1 radian/second on a rotary melt rheometer at 280 °C. In one embodiment, the polyesteramide has a melt viscosity of less than 6,000 poise as measured at 1 radian/second on a rotary melt rheometer at 280 °C. Viscosity at rad/sec is related to processability. Typical polymers have viscosities of less than 10,000 poise as measured at 1 radian/second when measured at their processing temperature.

Compositions

The present application also relates to compositions comprising the polyesteramide disclosed herein.

The compositions can further comprise additive known to one skilled in the art. In one embodiment, the compositions further comprises an additive chosen from antioxidants, colorants, mold release agents, flame retardants, plasticizers, nucleating agents, UV stabilizers, UV absorbers, thermal stabilizers, glass fibers, carbon fibers, fillers, impact modifiers, an epoxy silane, or isocyanate silane.

Examples of commercially available impact modifiers are well known in the art and useful in this invention include, but are not limited to, ethylene-co-glycidyl methacrylate based impact modifiers, ethylene/propylene terpolymers based impact modifiers, styrene-based block copolymeric impact modifiers, and various acrylic core/shell type impact modifiers.

Thermal stabilizers are compounds known to be effective in stabilizing polyesters during melt processing including but not limited to phosphoric acid, phosphorous acid, phosphonic acid, phosphinic acid, phosphonous acid, and various esters and salts thereof. The esters can be alkyl, branched alkyl, substituted alkyl, difunctional alkyl, alkyl ethers, aryl, and substituted aryl. The number of ester groups present in the particular phosphorus compound can vary from zero up to the maximum allowable based on the number of hydroxyl groups present on the phosphorus compound used.

Examples of thermal stabilizers include tributyl phosphate, triethyl phosphate, tri-butoxyethyl phosphate, t-butylphenyl diphenyl phosphate, 2-ethylhexyl diphenyl phosphate, ethyl dimethyl phosphate, isodecyl diphenyl phosphate, trilauryl phosphate, triphenyl phosphate, tricresyl phosphate, trixylenyl phosphate, t-butylphenyl diphenylphosphate, resorcinol bis(diphenyl phosphate), tribenzyl phosphate, phenyl ethyl phosphate, trimethyl thionophosphate, phenyl ethyl thionophosphate, dimethyl methylphosphonate, diethyl methylphosphonate, diethyl pentylphosphonate, dilauryl methylphosphonate, diphenyl methylphosphonate, dibenzyl methylphosphonate, diphenyl cresylphosphonate, dimethyl cresylphosphonate, dimethyl methylthionophosphonate, phenyl diphenylphosphinate, benzyl diphenylphosphinate, methyl diphenylphosphinate, trimethyl phosphine oxide, triphenyl phosphine oxide, tribenzyl phosphine oxide, 4-methyl diphenyl phosphine oxide, triethyl phosphite, tributyl phosphite, trilauryl phosphite, triphenyl phosphite, tribenzyl phosphite, phenyl diethyl phosphite, phenyl dimethyl phosphite, benzyl dimethyl phosphite, dimethyl methylphosphonite, diethyl pentylphosphonite, diphenyl methylphosphonite, dibenzyl methylphosphonite, dimethyl cresylphosphonite, methyl dimethylphosphinite, methyl diethylphosphinite, phenyl diphenylphosphinite, methyl diphenylphosphinite, benzyl diphenylphosphinite, triphenyl phosphine, tribenzyl phosphine, Merpol A, and methyl diphenyl phosphine.

Reinforcing materials are also useful in the compositions of this invention. The reinforcing materials may include carbon filaments, silicates, mica, clay, talc, titanium dioxide, Wollastonite, glass flakes, glass beads and fibers, and polymeric fibers and combinations thereof. The preferred reinforcing materials are glass, and it is further preferred to use fibrous glass filaments, mixtures of glass and talc, glass and mica, and glass and polymeric fibers.

In one embodiment, the composition can further comprise a polymer chosen from a polyesteramide other than those disclosed herein, a cellulose ester, a polyvinyl chloride, a nylon, a polyester, a polyamide, a polystyrene, a polystyrene copolymer, a styrene acrylonitrile copolymer, an acrylonitrile butadiene styrene copolymer, a poly(methylmethacrylate), an acrylic copolymer, a poly(ethery-imide), a polyphenylene oxide, a polyphenylene sulfide, a polysulfone, a polysulfone ether, or a poly(ether-ketone) of an aromatic dihydroxy compound.

In one class of this embodiment, the polyesteramide is present from about 1 to about 99 wt % based on the total weight of the composition; and the polymer is present from about 1 to about 99 wt % based the total weight of the composition. In one class of this embodiment, the polyesteramide is present from about 5 to about 95 wt % based on the total weight of the composition; and the polymer is present from about 5 to about 95 wt % based the total weight of the composition.

Articles

The present application relates to articles comprising the polyesteramides or compositions disclosed herein. In one embodiment, the articles are fibers, films, molded articles, containers, or sheeting. The methods of forming the polyesteramides or compositions disclosed herein into fibers, films, molded articles, containers, and sheeting are well known in the art. Such articles may be produced from the polyesteramides or compositions according to various embodiments of the present invention using any suitable method. Examples of such methods, depending on the type of shaped article, include, but are not limited to, extrusion, calendaring, thermoforming, blow molding, extrusion blow molding, injection molding, reactive injection molding, compression molding, casting, drafting, tentering, or blowing. Examples of potential molded articles include without limitation: medical devices such as dialysis equipment, medical packaging, healthcare supplies, commercial food service products such as food pans, tumblers and storage boxes, baby bottles, food processors, blender and mixer bowls, utensils, water bottles, crisper trays, washing machine fronts, and vacuum cleaner parts. Other potential molded articles could include, but are not limited to, ophthalmic lenses and frames. For instance, this material can be used to make bottles, including but not limited to, baby bottles, as it is clear, tough, heat resistant, and displays good hydrolytic stability.

In one embodiment, the surface of the article is reacted, treated or modified with an epoxy silane or an isocyanate silane. In one class of this embodiment, the surface of the article is reacted, treated or modified with an epoxy silane. In one class of this embodiment, the surface of the article is reacted, treated or modified with an isocyanate silane.

In one embodiment, the articles of manufacture are film(s) and/or sheet(s). The films and/or sheets useful in the present invention can be of any thickness which would be apparent to one of ordinary skill in the art. In one class of this embodiment, the film(s) of the invention have a thickness of no more than 40 mils. In one class of this embodiment, the film(s) of the invention have a thickness of no more than 35 mils. In one class of this embodiment, the film(s) of the invention have a thickness of no more than 30 mils. In one class of this embodiment, the film(s) of the invention have a thickness of no more than 25 mils. In one class of this embodiment, the film(s) of the invention have a thickness of no more than 20 mils.

In one class of this embodiment, the sheet(s) of the invention have a thickness of no less than 20 mils. In one class of this embodiment, the sheet(s) of the invention have a thickness of no less than 25 mils. In one class of this embodiment, the sheet(s) of the invention have a thickness of no less than 30 mils. In one class of this embodiment, the sheet(s) of the invention have a thickness of no less than 35 mils. In one class of this embodiment, the sheet(s) of the invention have a thickness of no less than 40 mils.

The methods of forming the polyesters into film(s) and/or sheet(s) are well known in the art. Examples of film(s) and/or sheet(s) of the invention including but not limited to extruded film(s) and/or sheet(s), calendered film(s) and/or sheet(s), compression molded film(s) and/or sheet(s), solution casted film(s) and/or sheet(s). Methods of making film and/or sheet include but are not limited to extrusion, calendering, compression molding, and solution casting.

Examples of potential articles made from film and/or sheet useful in the invention include, but are not limited, to uniaxially stretched film, biaxially stretched film, shrink film (whether or not uniaxially or biaxially stretched, liquid crystal display film (including but not limited to diffuser sheets, compensation films and protective films), thermoformed sheet, graphic arts film, outdoor signs, skylights, coating(s), coated articles, painted articles, laminates, laminated articles, and/or multiwall films or sheets.

In one embodiment, the article is a multilayer interlayer comprising a polyesteramide layer comprising a polyesteramide or polyesteramide composition disclosed herein.

In one class of this embodiment, the multilayer interlayer further comprises a first non-polyesteramide layer comprising a poly(vinylacetal) resin; and a first adhesive coating, wherein the first adhesive coating is at least partially interposed between the first non-polyesteramide layer and the polyesteramide layer.

In one subclass of this class, a laminate comprises the multilayer interlayer. In one subclass of this class, the first non-polyesteramide layer further comprises a plasticizer.

In one sub-subclass of this subclass, a laminate comprises the multilayer interlayer.

"Graphic art film," as used herein, is a film having a thermally-curable ink (e.g., heat-curable ink or air-curable ink) or radiation-curable ink (e.g., ultra-violet-curable ink) printed thereon or therein. "Curable" refers to capable of undergoing polymerization and/or crosslinking. In addition to the ink, the graphic art film may optionally also include varnishes, coatings, laminates, and adhesives.

In one embodiment, article is a graphic art film. In one class of this embodiment, the graphic art film has at least one property chosen from thermoformability, toughness, clarity, chemical resistance, Tg, and flexibility.

Graphic art films can be used in a variety of applications, such as, for example, in-mold decorated articles, embossed articles, hard-coated articles. In one class of this embodiment, the graphic art film is smooth or textured.

Exemplary graphic art films include, but are not limited to, nameplates; membrane switch overlays (e.g., for an appliance); point of purchase displays; flat or in-mold decorative panels on washing machines; flat touch panels on refrigerators (e.g., capacitive touch pad arrays); flat panel on ovens; decorative interior trim for automobiles (e.g., a polyester laminate); instrument clusters for automobiles; cell phone covers; heating and ventilation control displays; automotive console panels; automotive gear shift panels; control displays or warning signals for automotive instrument panels; facings, dials or displays on household appliances; facings, dials or displays on washing machines; facings, dials or displays on dishwashers; keypads for electronic devices; keypads for mobile phones, personal digital assistants (PDAs, or hand-held computers) or remote controls; displays for electronic devices; displays for hand-held electronic devices such as phones and PDAs; panels and housings for mobile or standard phones; logos on electronic devices; and logos for hand-held phones.

Multiwall film or sheet refers to sheet extruded as a profile consisting of multiple layers that are connected to each other by means of vertical ribs. In one embodiment, the article is a multiwall film or sheet. Examples of multiwall film or sheet include but are not limited to outdoor shelters (for example, greenhouses and commercial canopies).

Examples of extruded articles comprising the polyesteramides or compositions disclosed herein that useful in this invention include, but are not limited to, thermoformed sheet, film for graphic arts applications, outdoor signs, skylights, multiwall film, plastic film for plastic glass laminates, and liquid crystal display (LCD) films, including but not limited to, diffuser sheets, compensation films, and protective films for LCDs.

Other articles within the scope of the invention include but are not limited to safety/sport (examples including but not limited to: safety shields, face shields, sports goggles [racquetball, ski, etc.], police riot shields); corrugated sheet articles; recreation/outdoor vehicles and devices (examples including but not limited to: lawn tractors, snow mobiles, motorcycle windshield, camper windows, golf cart windshield, jet ski); residential and commercial lighting (examples including but not limited to: diffusers, office, home and commercial fixtures; High Intensity Discharge (HID) Lighting); telecommunications/business equipment/electronics (examples including but not limited to cell phone housing, TV housing, computer housing, stereo housing, PDAs, etc.); optical media; tanning beds; multiwall sheet, extruded articles; rigid medical packaging; intravenous components; dialysis filter housing; blood therapy containers; sterilization containers (for example, infant care sterilization containers); pacifiers, tool handles (examples including but not limited to screw drivers, hammer, etc.); thermoplastic articles; sound barriers; automotive exterior (headlight covers, taillight covers, side windows, sunroof); rigid consumer/industrial packaging; tubs; showers; hot tubs; machine guards; vending machine display panels; meters; sports and recreation (examples: swimming pool enclosures, stadium seats, hockey rink, open air structures, ski gondola); fish aquarium; ophthalmic products, decorative block windows; and interior automotive (instrument clusters).

In one embodiment, the article is a bottle. The methods of forming the polyesteramides or compositions disclosed herein into bottles are well known in the art. Examples of bottles include but are not limited to bottles such as pharmaceutical bottles, baby bottles; water bottles; juice bottles; large commercial water bottles having a weight from 200 to 800 grams; beverage bottles which include but are not limited to two liter bottles, 20 ounce bottles, 16.9 ounce bottles; medical bottles; personal care bottles, carbonated soft drink bottles; hot fill bottles; water bottles; alcoholic beverage bottles such as beer bottles and wine bottles; and bottles comprising at least one handle. These bottles include but are not limited to injection blow molded bottles, injection stretch blow molded bottles, extrusion blow molded bottles, and extrusion stretch blow molded bottles. Methods of making bottles include but are not limited to extrusion blow molding, extrusion stretch blow molding, injection blow molding, and injection stretch blow molding. Preforms (or parisons) can be used to make each of said bottles.

These bottles include, but are not limited to, injection blow molded bottles, injection stretch blow molded bottles, extrusion blow molded bottles, and extrusion stretch blow molded bottles. Methods of making bottles include but are not limited to extrusion blow molding, extrusion stretch blow molding, thermoforming, injection blow molding, and injection stretch blow molding.

In one embodiment, the article is a container. Examples include containers for cosmetics and personal care applications including bottles, jars, vials and tubes; sterilization containers; buffet steam pans; food pans or trays; frozen food trays; microwaveable food trays; hot fill containers, amorphous lids or sheets to seal or cover food trays; food storage containers; for example, boxes; tumblers, pitchers, cups, bowls, including but not limited to those used in restaurant smallware; beverage containers; retort food containers; centrifuge bowls; vacuum cleaner canisters, and collection and treatment canisters.

"Restaurant smallware," as used herein, refers to any container used for eating or serving food. In one embodiment, the article is a restaurant smallware. Examples of restaurant smallware include pitchers, cups, mugs optionally including handles (including decorative mugs, single-or double walled mugs, pressurized mugs, vacuum mugs), bowls (e.g., serving bowls, soup bowls, salad bowls), and plates (e.g., eating and serving plates, such as buffet plates, saucers, dinner plates).

In one class of this embodiment, the restaurant smallware is capable of withstanding refrigerator temperatures ranging from greater than 0 °C. (e.g., 2 °C.) to 5 °C. In one class of this embodiment, the restaurant smallware can withstand steam treatments and/or commercial dishwasher conditions. In one class of this embodiment, the restaurant smallware is capable of withstanding microwave conditions. In one class of this embodiment, restaurant smallware has at least one property chosen from toughness, clarity, chemical resistance, Tg, hydrolytic stability, and dishwasher stability.

In one embodiment, the article is a medical device. Examples include but are not limited to medical devices comprising an ultraviolet light (UV)-curable, silicone-based coating, on at least a portion of a surface of a medical device.

In one embodiment, the article is a thermoplastic article, typically in the form of sheet material, having a decorative material embedded therein.

"Food storage container," as used herein, are capable of storing and/or serving hot and/or cold food and/or beverages at temperatures customarily used for storing and serving foods and beverages, e.g., ranging from deep freezer temperatures to hot temperatures such as those in a low temperature oven or those used in hot beverage dispensers. In one embodiment, the article is a food storage container. In one class of this embodiment, the food storage container can be sealed to reduce the rate of food oxidation. In one class of this embodiment, the food storage container can be used to display and serve the food to dining customers. In one class of this embodiment, the food storage container is capable of being stored in a freezer, e.g., at temperatures less than 0 °C, such as temperatures ranging from −20 to 0 °C (e.g., −18 °C). In one class of this embodiment, the food storage container is capable of storing food in the refrigerator at temperatures ranging from greater than 0 °C (e.g., 2 °C) to 5 °C. In one class of this embodiment, the food storage container can withstand steam treatments and/or commercial dishwasher conditions. In one class of this embodiment, the food storage container is capable of withstanding microwave conditions.

Examples of food storage containers include buffet steam pans, buffet steam trays, food pans, hot and cold beverage dispensers (e.g. refrigerator beverage dispensers, automated hot or cold beverage dispensers), and food storage boxes.

In one class of this embodiment, food storage container has at least one additional property chosen from toughness, clarity, chemical resistance, Tg, and hydrolytic stability.

In one embodiment, the article is a thermoplastic article, which is obtained by applying heat and pressure to one or more laminates or "sandwiches", wherein at least one of said laminates comprises, in order, (1) at least one upper sheet material, (2) at least one decorative material, and (3) at least one lower sheet material. Optionally, an adhesive layer may be used between (1) and (2) and/or between (2) and (3). Any of layers (1), (2) and/or (3) of the "sandwich" may comprise any of the polyesteramides or compositions disclosed herein.

"Ophthalmic product" as used herein, refers to prescription eyeglass lenses, nonprescription eyeglass lenses, sunglass lenses, and eyeglass and sunglass frames. In one embodiment, the article is an ophthalmic product. In one class of this embodiment, the ophthalmic product is chosen from tinted eyeglass lenses and hardcoated eyeglass lenses. In one class of this embodiment, the eyeglass lenses, such as the tinted eyeglass lenses or hardcoated eyeglass lenses, comprise at least one polarizing film or polarizing additive. In one class of this embodiment, when the ophthalmic product is a lens, the ophthalmic product has a refractive index ranging from 1.54 to 1.56. In one class of this embodiment, the ophthalmic product can have at least one property chosen from toughness, clarity, chemical resistance (e.g., for withstanding lens cleaners, oils, hair products, etc.), Tg, and hydrolytic stability.

"Outdoor sign," as used herein, refers to a surface formed from the polyester described herein, or containing symbols (e.g., numbers, letters, words, pictures, etc.), patterns, or designs coated with the polyester or polyester film described herein. In one embodiment, the article is an outdoor sign. In one class of this embodiment, the outdoor sign comprises printed symbols, patterns, or designs. In one class of this embodiment, the outdoor sign is capable of withstanding typical weather conditions, such as rain, snow, ice, sleet, high humidity, heat, wind, sunlight, or combinations thereof, for a sufficient period of time, e.g., ranging from one day to several years or more.

Exemplary outdoor signs include, but are not limited to, billboards, neon signs, electroluminescent signs, electric signs, fluorescent signs, and light emitting diode (LED) displays. Other exemplary outdoor signs include, but are not limited to, painted signs, vinyl decorated signs, thermoformed signs, and hardcoated signs.

In one class of this embodiment, the outdoor sign has at least one property chosen from thermoformability, toughness, clarity, chemical resistance, and Tg.

A "vending machine display panel," as used herein, refers to a front or side panel on a vending machine that allows a customer to view the items for sale, or advertisement regarding such items. In one embodiment, the article is a vending machine display panel. In one class of this embodiment, the vending machine display panel is a visually clear panel of a vending machine through which a consumer can view the items on sale. In one class of this embodiment, the vending machine display panel can have sufficient rigidity to contain the contents within the machine and/or to discourage vandalism and/or theft. In one class of this embodiment, the vending machine display panel can have dimensions well known in the art, such as planar display panels in snack, beverage, popcorn, or sticker/ticket vending machines, and capsule display panels as in, e.g., gumball machines or bulk candy machines. In one class of this embodiment, the vending machine display panel can optionally contain advertising media or product identification indicia. Such information can be applied by methods well known in the art, e.g., silk screening.

In one class of this embodiment, the vending machine display panel can be resistant to temperatures ranging from −100 to 120 °C. In another embodiment, the vending machine display panel can be UV resistant by the addition of, e.g., at least one UV additive, as disclosed herein. In one class of this embodiment, the vending machine display panel has at least one property chosen from thermoformability, toughness, clarity, chemical resistance, and Tg.

"Point of purchase display," as used herein, refers to a wholly or partially enclosed casing having at least one visually clear panel for displaying an item. Point of purchase displays are often used in retail stores to for the purpose of catching the eye of the customer. In one embodiment, the article is a point of purchase display. Exemplary point of purchase displays include enclosed wall mounts, countertops, enclosed poster stands, display cases (e.g., trophy display cases), sign frames, and cases for computer disks such as CDs and DVDs. The point of purchase display can include shelves, and additional containers, such as holders for magazines or pamphlets. One of ordinary skill in the art can readily envision the shape and dimensions for the point of purchase display depending on the item to be displayed. For example, the display can be as small as a case for jewelry, or a larger enclosed cabinet for displaying multiple trophies. In one class of this embodiment, the point of purchase display has at least one property chosen from toughness, clarity, chemical resistance, Tg, and hydrolytic stability.

"Intravenous component," as used herein, refers to components made from a polymeric material used for administering fluids (e.g., medicaments, nutrients) to the bloodstream of a patient. In one embodiment, the article is an intravenous component. In one class of this embodiment, the intravenous component is a rigid component.

Exemplary intravenous components include y-site connector assemblies, luer components, filters, stopcocks, manifolds, and valves. A y-site connector has a "Y" shape including a first arm having a first passage, a second arm having a second passage, and a third arm connected with said first and second arms and having a third passage communicating with said first and second passages. Luer components can include luer locks, connections, and valves.

In one class of this embodiment, the intravenous component can withstand sterilization treatments, such as high pressure steam sterilization, ethylene oxide gas sterilization, radiation sterilization, and dry-heating sterilization. In one class of this embodiment, the intravenous component has at least one property chosen from toughness, clarity, chemical resistance, Tg, and hydrolytic stability.

A "dialysis filter housing," as used herein, refers to a protective casing having a plurality of openings for holding a plurality of hollow fibers or tubing, which can be used for introducing and discharging a dialyzate to a patient. In one embodiment, the article is a dialysis filter housing. In one class of this embodiment, a cross-sectional area of one opening in the protective casing of the dialysis filter housing ranges from 0.001 $cm^2$ to less than 50 $cm^2$. In one class of this embodiment, the dialysis filter housing has at least one property chosen from toughness, clarity, chemical resistance, Tg, and hydrolytic stability.

"Blood therapy containers," as used herein, refers to those containers used in administering and withdrawing blood to and from a patient. In one embodiment, the article is a blood therapy container. Exemplary blood therapy containers include oxygenators, cassettes, centrifuge bowls, collection and treatment canisters, pump cartridges, venal port housings, and dialyzer housings. Oxygenators can remove carbon dioxide from the venous blood of the patient, introduce oxygen to the withdrawn blood to convert it into arterial blood, and introduce the oxygenated blood to the patient. Other containers can be used to temporarily house the withdrawn or stored blood prior to its administration to the patient.

In one class of this embodiment, the blood therapy container can withstand sterilization treatments, such as high pressure steam sterilization, ethylene oxide gas sterilization, radiation sterilization, and dry-heating sterilization. In one class of this embodiment, the blood therapy container has at least one property chosen from toughness, clarity, chemical resistance, Tg, and hydrolytic stability.

"Appliance parts," as used herein, refers to a rigid piece used in conjunction with an appliance. In one embodiment, the article is an appliance part. In one class of this embodiment, the appliance part is partly or wholly separable from the appliance. In one class of this embodiment, the appliance part is one that is typically made from a polymer. In one embodiment, the appliance part is visually clear.

Exemplary appliance parts include those requiring toughness and durability, such as cups and bowls used with food processers, mixers, blenders, and choppers; parts that can withstand refrigerator and freezer temperatures (e.g., refrigerator temperatures ranging from greater than 0 °C (e.g., 2 °C) to 5 °C, or freezer temperatures, e.g., at temperatures less than 0 °C, such as temperatures ranging from −20 to 0 °C, e.g., −18 °C), such as refrigerator and freezer trays, bins, and shelves; parts having sufficient hydrolytic stability at temperatures up to 90 °C, such as washing machine doors, steam cleaner canisters, tea kettles, and coffee pots; and vacuum cleaner canisters and dirt cups.

In one class of this embodiment, these appliance parts have at least one property chosen from toughness, clarity, chemical resistance, Tg, hydrolytic stability, and dishwasher stability. The appliance part can also be chosen from steam cleaner canisters, which, in one embodiment, can have at least one property chosen from toughness, clarity, chemical resistance, Tg, and hydrolytic stability.

In one class of this embodiment, the polyesteramides useful in the appliance part has a $T_g$ of 105 °C to 140 °C and the appliance part is chosen from vacuum cleaner canisters and dirt cups. In one class of this embodiment, the polyesteramides useful in the appliance part has a $T_g$ of 120 to 200 °C and the appliance part is chosen from steam cleaner canisters, tea kettles and coffee pots.

"Skylight," as used herein, refers to a light permeable panel secured to a roof surface such that the panel forms a portion of the ceiling. In one embodiment, the article is a skylight. In one class of this embodiment, the panel is rigid, e.g., has dimensions sufficient to achieve stability and durability, and such dimensions can readily be determined by one skilled in the art. In one class of this embodiment, the skylight panel has a thickness greater than 3/16 inches, such as a thickness of at least ½ inches.

In one class of this embodiment, the skylight panel is visually clear. In one embodiment, the skylight panel can transmit at least 35% visible light, at least 50%, at least 75%, at least 80%, at least 90%, or even at least 95% visible light. In one class of this embodiment, the skylight panel comprises at least one UV additive that allows the skylight panel to block up to 80%, 90%, or up to 95% UV light.

In one class of this embodiment, the skylight has at least one property chosen from thermoformability, toughness, clarity, chemical resistance, and Tg.

"Outdoor shelters," as used herein, refer to a roofed and/or walled structure capable of affording at least some protection from the elements, e.g., sunlight, rain, snow, wind, cold, etc., having at least one rigid panel. In one embodiment, the article is an outdoor shelter. In one class of this embodiment, the outdoor shelter has at least a roof and/or one or more walls. In one class of this embodiment, the outdoor shelter has dimensions sufficient to achieve stability and durability, and such dimensions can readily be determined by one skilled in the art. In one class of this embodiment, the outdoor shelter panel has a thickness greater than 3/16 inches.

In one class of this embodiment, the outdoor shelter panel is visually clear. In one class of this embodiment, the outdoor shelter panel can transmit at least 35% visible light, at least 50%, at least 75%, at least 80%, at least 90%, or even at least 95% visible light. In one class of this embodiment, the outdoor shelter panel comprises at least one UV additive that allows the outdoor shelter to block up to 80%, 90%, or up to 95% UV light.

Exemplary outdoor shelters include security glazings, transportation shelters (e.g., bus shelters), telephone kiosks, and smoking shelters. In one class of this embodiment, where the shelter is a transportation shelter, telephone kiosk, or smoking shelter, the shelter has at least one property chosen from thermoformability, toughness, clarity, chemical resistance, and Tg. In one class of this embodiment, where the shelter is a security glazing, the shelter has at least one property chosen from toughness, clarity, chemical resistance, and Tg.

A "canopy," as used herein, refers to a roofed structure capable of affording at least some protection from the elements, e.g., sunlight, rain, snow, wind, cold, etc. In one embodiment, the roofed structure comprises, either in whole or in part, at least one rigid panel, e.g., has dimensions sufficient to achieve stability and durability, and such dimensions can readily be determined by one skilled in the art. In one embodiment, the article is a canopy. In one class of this embodiment, the canopy panel has a thickness greater than 3/16 inches, such as a thickness of at least ½ inches.

In one class of this embodiment, the canopy panel is visually clear. In one embodiment, the canopy panel can transmit at least 35% visible light, at least 50%, at least 75%, at least 80%, at least 90%, or even at least 95% visible light. In one class of this embodiment, the canopy panel comprises at least one UV additive that allows the canopy to block up to 80%, 90%, or up to 95% UV light.

Exemplary canopies include covered walkways, roof lights, sun rooms, airplane canopies, and awnings. In one embodiment, the canopy has at least one property chosen from toughness, clarity, chemical resistance, Tg, and flexibility.

An "optical medium," as used herein, refers to an information storage medium in which information is recorded by irradiation with a laser beam, e.g., light in the visible wavelength region, such as light having a wavelength ranging from 600 to 700 nm. By the irradiation of the laser beam, the irradiated area of the recording layer is locally heated to change its physical or chemical characteristics, and pits are formed in the irradiated area of the recording layer. Since the optical characteristics of the formed pits are different from those of the area having been not irradiated, the digital information is optically recorded. The recorded information can be read by reproducing procedure generally comprising the steps of irradiating the recording layer with the laser beam having the same wavelength as that employed in the recording procedure, and detecting the light-reflection difference between the pits and their periphery. In one embodiment, the article is an optical medium.

In one class of this embodiment, the optical medium comprises a transparent disc having a spiral pregroove, a recording dye layer placed in the pregroove on which information is recorded by irradiation with a laser beam, and a light-reflecting layer. The optical medium is optionally recordable by the consumer. In one class of this embodiment, the optical medium is chosen from compact discs (CDs) and digital video discs (DVDs). The optical medium can be sold with prerecorded information, or as a recordable disc.

In one class of this embodiment, at least one of the following comprises the polyesteramides or compositions disclosed herein: the substrate, at least one protective layer of the optical medium, and the recording layer of the optical medium. In one class of this embodiment, the optical medium has at least one property chosen from toughness, clarity, chemical resistance, Tg, and hydrolytic stability.

"Infant-care sterilization container," as used herein, refers to a container configured to hold infant-care products for use in in-home sterilization of the infant-care products. In one embodiment, the article is an infant-care sterilization container. In one class of this embodiment, the infant-care sterilization container is a baby bottle sterilization container. In one class of this embodiment, infant-care sterilization containers have at least one additional property chosen from toughness, clarity, chemical resistance, Tg, hydrolytic stability, and dishwasher stability.

"Pacifiers" as used herein, comprise a flexible nipple (e.g., for an infant to suck and/or bite) surrounded by a rigid mouth shield, where the rigid mouth shield is optionally connected to a handle, allowing the infant or supervising adult a convenient structure for gripping and/or holding the pacifier. The handle may be rigid or flexible. In one embodiment, the article is a pacifier.

In one class of this embodiment, the pacifier can be made of multiple components. For example, the nipple can pass through an aperture in the center of the mouth shield. The handle may or may not be integrally connected to the mouth shield. The handle can be rigid or flexible.

In one class of this embodiment, the nipple and mouth shield of the pacifier is formed as an integral unit. Generally, the selection of plastic is governed by the need to provide a relatively rigid mount shield and handle. In one class of this embodiment, the nipple of the pacifier may be more rigid yet still be desirable for an infant to suck or bite.

In one class of this embodiment, pacifiers have at least one property chosen from toughness, clarity, chemical resistance, Tg, hydrolytic stability, and dishwasher stability.

A "retort food container," as used herein, refers to flexible container or pouch for storing food and/or beverages, in which the food and/or beverage is hermetically sealed for long-term unrefrigerated storage. The food can be sealed under vacuum or an inert gas. The retort food container can comprise at least one polyester layer, e.g., a single layer or multi-layer container. In one embodiment, the article is a retort food container. In one class of this embodiment, a multi-layer container includes a light reflecting inner layer, e.g., a metallized film.

In one class of this embodiment, at least one foodstuff chosen from vegetables, fruit, grain, soups, meat, meat products, dairy products, sauces, dressings, and baking supplies is contained in the retort food container.

In one class of this embodiment, the retort food container has at least one property chosen from toughness, clarity, chemical resistance, Tg, and hydrolytic stability.

A "glass laminate," as used herein, refers to at least one coating on a glass, where at least one of the coatings comprises the polyesteramide. The coating can be a film or a sheet. The glass can be clear, tinted, or reflective. In one embodiment, the article is a glass laminate. In one class of this embodiment, the laminate is permanently bonded to the glass, e.g., applying the laminate under heat and pressure to form a single, solid laminated glass product. One or both faces of the glass can be laminated. In one class of this embodiment, the glass laminate contains more than one coating comprising the polyesteramide or the compositions disclosed herein. In one class of this embodiment, the glass laminate comprises multiple glass substrates, and more than one coating comprising the polyester compositions of the present invention.

Exemplary glass laminates include windows (e.g., windows for high rise buildings, building entrances), glass walls or sides, glass roofing, safety glass, windshields for transportation applications (e.g., automotive, buses, jets, armored vehicles), bullet proof or resistant glass, security glass (e.g., for banks), hurricane proof or resistant glass, airplane canopies, mirrors, solar glass panels, flat panel displays, and blast resistant windows. The glass laminate can be visually clear, be frosted, etched, or patterned.

In one class of this embodiment, the glass laminate can be UV resistant by the addition of, e.g., at least one UV additive, as disclosed herein.

Methods for laminating the films and/or sheets of the present invention to the glass are well known to one of ordinary skill in the art. Lamination without the use of an adhesive layer may be performed by vacuum lamination. To obtain an effective bond between the glass layer and the laminate, in one embodiment, the glass has a low surface roughness.

Alternatively, a double-sided adhesive tape, an adhesive layer, or a gelatin layer, obtained by applying, for example, a hotmelt, a pressure- or thermo-sensitive adhesive, or a UV or electron-beam curable adhesive, can be used to bond the laminate of the present invention to the glass. The adhesive layer may be applied to the glass sheet, to the laminate, or to both, and may be protected by a stripping layer, which can be removed just before lamination.

In one class of this embodiment, the glass laminate has at least one property chosen from toughness, clarity, chemical resistance, hydrolytic stability, surface energy, and Tg.

Processes

The present application also discloses a process for the preparation of a polyesteramide which comprises: (1) reacting a reaction mixture comprising: (i) 5 to 25 mole % of an at least one diol; and (ii) 50 to 75 mole % of at least one diacid; in a reaction zone at a first temperature, at a first pressure, and for a first time sufficient to provide at least one reaction product comprising 1 to 2 residues derived from the at least one diacid and 1 residue of the at least one diol; (2) adding 5 to 25 mole % of a diamine and at least 25 mole % of water to the reaction zone comprising the at least one reaction product; and (3) reacting the diamine with the at least one reaction product at a second temperature, at a second pressure, and for a second time sufficient to provide the polyesteramide; wherein the mole % of the diol, diacid, or diamine is based on the total moles of the diol, diacid and diamine, and wherein the mole % of the water is based on the total moles of the diacid and water.

In one embodiment, the water in step (2) is added at at least 1 mole %. In one embodiment, the water in step (2) is added at at least 5 mole %. In one embodiment, the water in step (2) is added at at least 10 mole %. In one embodiment, the water in step (2) is added at at least 15 mole %. In one embodiment, the water in step (2) is added at at least 20 mole %.

Step (1)

Reaction times for Step (1) are dependent upon the selected temperatures, pressures, and feed mole ratios of the at least one diol and the at least one diacid. In one embodiment, the first time is from about 5 min to about 24 hours. In one embodiment, the first time is from about 20 min to about 24 hours. In one embodiment, the first time is from about 5 min to about 6 hours. In one embodiment, the first time is from about 1 hour to about 24 hours. In one embodiment, the first time is from about 1 hours to about 6 hours.

The temperature for Step (1), can be maintained at one temperature or variable temperatures. In one embodiment, the first temperature is at least one temperature in the range of from about 100 °C to about 300 °C. In one embodiment, the first temperature is at least one temperature in the range of from about 200 °C to about 300 °C.

The pressure for Step (1) the pressure can be maintained at one pressure or variable pressures. In one embodiment, the first pressure is at least one pressure in the range of from about 0 torr absolute to about 5171 torr absolute. In one embodiment, the first pressure is at least one pressure in the range of from about 0 torr to about 2585 torr absolute. In one embodiment, the first pressure is at least one pressure in the range of from about 0 torr absolute to about 1551 torr absolute. In one embodiment, the first pressure is at least one pressure in the range of from about 0 torr absolute to about 776 torr absolute.

Catalysts can be used to catalyze the reaction of Step (1). In one embodiment, Step (1) further comprises a catalyst. Examples of catalysts that can be used are based on titanium, tin, gallium, zinc, antimony, cobalt, manganese, germanium, alkali metals, particularly lithium and sodium, alkaline earth compounds, aluminum compounds, combinations of aluminum compounds with lithium hydroxide or sodium hydroxide. In one class of this embodiment, the catalyst is based on titanium or tin. Tin compounds are useful for polyesters containing TMCD as disclosed in U.S. Pat. No. 8,101,705 B2 and can be used in the process disclosed herein.

In one class of this embodiment, the catalyst is present from 1 to 500 ppm. In one subclass of this class, the catalyst is a tin catalyst. In one subclass of this class, the catalyst is a titanium catalyst.

In one class of this embodiment, the catalyst is present from 1 to 300 ppm. In one subclass of this class, the catalyst is a tin catalyst. In one subclass of this class, the catalyst is a titanium catalyst.

In one class of this embodiment, the catalyst is present from 5 to 125 ppm. In one subclass of this class, the catalyst is chosen from a tin catalyst or a titanium catalyst. In one subclass of this class, the catalyst is a tin catalyst. In one subclass of this class, the catalyst is a titanium catalyst.

In one class of this embodiment, the catalyst is present from 10 to 100 ppm. In one subclass of this class, the catalyst is chosen from a tin catalyst or a titanium catalyst. In one subclass of this class, the catalyst is a tin catalyst. In one subclass of this class, the catalyst is a titanium catalyst.

Examples of suitable titanium compounds include titanium(IV) 2-ethylhexyloxide (e.g., Tyzor® TOT), titanium(IV) (triethanolaminato)isopropoxide (e.g., Tyzor® TE), tetraisopropyl titanate, titanium diisopropoxide bis(acetylacetonate), and tetrabutyl titanate (e.g., Tyzor® TBT). Examples of suitable tin compounds include butyltin tris-2-ethylhexanoate, butylstannoic acid, stannous oxalate, dibutyltin oxide.

Step (3)

Reaction times for Step (3) are dependent upon the selected temperatures, pressures, and feed mole ratios of the at least one diol and the at least one diacid. In one embodiment, the first time is from about 5 min to about 24 hours. In one embodiment, the first time is from about 20 min to about 24 hours. In one embodiment, the first time is from about 5 min to about 6 hours. In one embodiment, the first time is from about 1 hour to about 24 hours. In one embodiment, the first time is from about 1 hours to about 6 hours.

For Step (3), the temperature can be at one temperature or variable temperatures. In one embodiment, the second temperature is at least one temperature in the range of from about 0 °C to about 350 °C. In one embodiment, the second temperature is at least one temperature in the range of from about 32 °C to about 350 °C. In one embodiment, the second temperature is at least one temperature in the range of from about 50 °C to about 350 °C. In one embodiment, the second temperature is at least one temperature in the range of from about 100 °C to about 350 °C. In one embodiment, the second temperature is at least one temperature in the range of from about 200 °C to about 350 °C. In one embodiment, the second temperature is at least one temperature in the range of from about 250 °C to about 350 °C.

The pressure for Step (3) the pressure can be maintained at one pressure or variable pressures. In one embodiment, the second pressure is at least one pressure in the range of from about 0.1 torr absolute to about 760 torr absolute. In one embodiment, the second pressure is at least one pressure in the range of from about 0.1 torr absolute to about 100 torr absolute. In one embodiment, the second pressure is at least one pressure in the range of from about 0.1 torr absolute to about 50 torr absolute. In one embodiment, the second pressure is at least one pressure in the range of from about 0.1 torr absolute to about 10 torr absolute. In one embodiment, the first pressure is at least one pressure in the range of from about 0.1 torr absolute to about 5 torr absolute.

Step (3) can be conducted by blowing hot nitrogen gas over the reaction mixture.

Catalysts can be used to catalyze the reaction of Step (3). In one embodiment, Step (3) further comprises a catalyst. Examples of catalysts that can be used are based on titanium, tin, gallium, zinc, antimony, cobalt, manganese, germanium, alkali metals, particularly lithium and sodium, alkaline earth compounds, aluminum compounds, combinations of aluminum compounds with lithium hydroxide or sodium hydroxide. In one class of this embodiment, the catalyst is based on titanium or tin. Tin compounds are useful for polyesters containing TMCD as disclosed in U.S. Pat. No. 8,101,705 B2 and can be used in the process disclosed herein.

In one class of this embodiment, the catalyst is present from 1 to 500 ppm. In one subclass of this class, the catalyst is a tin catalyst. In one subclass of this class, the catalyst is a titanium catalyst.

In one class of this embodiment, the catalyst is present from 1 to 300 ppm. In one subclass of this class, the catalyst is a tin catalyst. In one subclass of this class, the catalyst is a titanium catalyst.

In one class of this embodiment, the catalyst is present from 5 to 125 ppm. In one subclass of this class, the catalyst is chosen from a tin catalyst or a titanium catalyst. In one subclass of this class, the catalyst is a tin catalyst. In one subclass of this class, the catalyst is a titanium catalyst.

In one class of this embodiment, the catalyst is present from 10 to 100 ppm. In one subclass of this class, the catalyst is chosen from a tin catalyst or a titanium catalyst. In one subclass of this class, the catalyst is a tin catalyst. In one subclass of this class, the catalyst is a titanium catalyst.

Examples of suitable titanium compounds include titanium(IV) 2-ethylhexyloxide (e.g., Tyzor® TOT), titanium(IV) (triethanolaminato)isopropoxide (e.g., Tyzor® TE), tetraisopropyl titanate, titanium diisopropoxide bis(acetylacetonate), and tetrabutyl titanate (e.g., Tyzor® TBT). Examples of suitable tin compounds include butyltin tris-2-ethylhexanoate, butylstannoic acid, stannous oxalate, dibutyltin oxide.

Step (2)

The conditions for Step (2) can be those for Steps (1) or (3).

The following examples are given to illustrate the invention and to enable any person skilled in the art to make and use the invention. It should be understood, however, that the invention is not to be limited to the specific conditions or details described in these examples. The patentable scope of the invention is defined by the claims, and may include other examples that occur to those skilled in the art.

EXAMPLES

Abbreviations

AD is adipic acid; AZ is azelaic acid; 1,4-BDO is 1,4-butanediol; DDA is 1,12-dodecanedioic acid; 1,4-CHDA: 1,4-cyclohexanedicarboxylic acid; 1,3-CHDA: 1,3-cyclohexanedicarboxylic acid; ECTMS is trimethoxy[2-(7-oxabicyclo[4.1.0]hept-3-yl)ethyl]silane; GPTMS is (3-glycidyloxypropyl)trimethoxysilane; H2-dimer is hydrogenated dimer acid (Pripol 1009, Registry No. 127290-22-6); MACM: 4,4'-methylenebis(2-methylcyclohexylamine), mixture of isomers; MDEA is N-methyl diethanolamine; ODA is 1,18-octadecanoic acid; PACM: 4,4'-methylenebis (cyclohexylamine), mixture of isomers; PTMG1 is polytetrahydrofuran, having $M_n$ 250 Dalton; PTMG2 is polytetrahydrofuran, having $M_n$ 1000 Dalton; SE is sebacic acid; T928 is Tinuvin 928 (2-(2H-benzotriaol-2-yl)-6-(1-methyl-1-phenylethyl)-4-(1,1,3,3-tetramethylbutyl)phenol; TCDA is 3(4).8(9)-bis(aminomethyl)tricyclo[5.2.1.$0^{2,6}$]decane; TMCA: 5-amino-1,3,3-trimethylcyclohexanemethylamine; TMP is trimethylolpropaone; CHDMA: 1,4-bis(aminomethyl)cyclohexane; 1,3-CHDMA is 1,3-bis(aminomethyl) cyclohexane; TMCD: 2,2,4,4-tetramethyl-1,3-cyclobutanediol; CHDM: 1,4-cyclohexanedimethanol, MPMD is 2-methylpentamethyldiamine, min: minute(s);

Inherent Viscosity Measurement

The inherent viscosities (IV) of the particular polymer materials useful herein are determined according to ASTM D2857-70 procedure, in a Wagner Viscometer of Lab Glass, Inc., having a ½ mL capillary bulb, using a polymer concentration about 0.5% by weight in 60/40 by weight of phenol/tetrachloroethane. The procedure is carried out by heating the polymer/solvent system at 120 °C for 15 minutes, cooling the solution to 25 °C and measuring the time of flow at 25 °C. The IV is calculated from the equation:

$$\eta_{inh} = \frac{\ln\frac{t_S}{t_0}}{C}$$

where: η: inherent viscosity at 25 °C at a polymer concentration of 0.5 g/100 mL of solvent; $t_S$: sample flow time; $t_0$: solvent-blank flow time; C: concentration of polymer in grams per 100 mL of solvent.

The units of the inherent viscosity throughout this application are in the deciliters/gram.

In the following examples, a viscosity was measured in tetrachloroethane/phenol (50/50, weight ratio) at 30 °C and calculated in accordance with the following equation:

$$\eta_{inh} = \frac{\ln(\eta_{sp})}{C}$$

wherein $\eta_{sp}$ is a specific viscosity and C is a concentration.

Differential Scanning calorimetry Thermal Analysis

The DSC experiments were carried out on a TA Instrument Q2000 DSC under nitrogen with a refrigerated cooling system. Temperature and heat of fusion of the instrument are routinely calibrated and verified with adamantane, lead and indium. Approximately samples were sealed in an aluminum pan. The sample pan was equilibrated at −50 °C before heated to 250 °C at a scanning rate of 20 °C/min. The sample was then isothermally held at 250 °C for 1 min to remove its thermal history. Then the sample pan was cooled to −50 °C at a rate of 20 °C/min, before it was reheated to 250 °C at the same scanning rate. Both the glass transition temperature and the melting peak were captured during the seconding heating scan.

Example 1 (Method 1)

A mixture of adipic acid (43.84 g, 0.30 mole, 10 eq.), 2,2,4,4-tetramethylcyclobutanediol (9.08 g, 0.06 mole, 2 eq.) and titanium tetraisopropoxide solution (0.1 M in isopropanol, 2.6 mL, 0.26 mmol) was melted at 250 °C under a dry nitrogen stream. The temperature was gradually raised to 275 °C and held at 275 °C for 30 min. At that point, 4,4'-methylenebis(2-methylcyclohexylamine) (57.22 g, 0.24 mol, 8 eq.) and water (30 mL) were added. The temperature was gradually raised to 300 °C. The temperature being raised as necessary to maintain the reaction mixture molten. The system was then subjected to high vacuum (0.1 torr) to remove the volatiles. The melt was then polymerized by heating at 300 °C for 90 min to give Ex 1.

Example 2: (Method 2)

A mixture of 1,12-dodecandioic acid (69.09 g, 0.3 mole, 10 eq.), 2,2,4,4-tetramethylcyclobutanediol (29.85 g, 0.207 mole, 6.9 eq.), 4,4'-methylenebis(2-methylcyclohexylamine) (14.30 g, 0.06 mol, 2.0 eq), 4,4'-methylenebiscyclohexylamine (16.41 g, 0.078 mol, 2.6 eq) and butyltin tris-2-ethylhexanoate (1.7 wt % in butanol, 1.26 mL, 200 ppm) were placed in a 500-mL flask equipped with an inlet for nitrogen, a metal stirrer and a short distillation column. The flask was immersed in a 20 0°C molten metal bath under a dry nitrogen stream. After 1 minute, the bath temperature was gradually increased to 250 °C over 60 minutes and 275 °C over 60 minutes. After being held at 275 °C for 30 minutes, the mixture was gradually subjected to vacuum over the next 15 minutes to a set point of 0.5 torr. The melt was held at 275 °C at the set point of 0.5 torr for 130 minutes to give Ex 2.

Example 3 (Method 3)

A mixture of adipic acid (146.15 g, 1.0 mole, 10 eq.), 1,4-cyclohexanedimethanol (102.40 g, 0.71 mole, 7.1 eq.), 4,4'-methylenebis(2-methylcyclohexylamine) (75.29 g, 0.31 mol, 3.1 eq) and water (20 mL) were placed in a 1-liter flask equipped with an inlet for nitrogen, a metal stirrer and a short distillation column. The flask was immersed in a 180 °C molten metal bath under a dry nitrogen stream. After 1 minute, the bath temperature was gradually increased to 210 °C over 10 minutes and held at 210 °C for 30 minutes. Titanium tetraisopropoxide solution (0.47 wt % in isopropanol, 3.0 mL, 50 ppm) was added through a side port. The resulting mixture was heated to 250 °C over 30 minutes, then to 275 °C over 10 minutes, held at 275 °C for 40 minutes. Vacuum was gradually applied over the next 20 minutes to a set point of 0.5 torr. The melt was held at 275 °C at a set point of 0.5 torr for 270 minutes to give Ex 3.

Example 4 (Method 4)

A mixture of 1,12-dodecandioic acid (80.61 g, 0.35 mole, 10 eq.), 1,4-cyclohexanedimethanol (29.28 g, 0.203 mole, 5.5 eq.), 4,4'-methylenebis(2-methylcyclohexylamine) (20.86 g, 0.088 mol, 2.5 eq), 4,4'-methylenebis-cyclohexylamine (14.73 g, 0.070 mol, 2.0 eq) and titanium tetraisopropoxide (0.944 wt % in butanol, 0.4 mL, 30 ppm) were placed in a 500-mL flask equipped with an inlet for nitrogen, a metal stirrer and a short distillation column. The flask was immersed in a 200 °C molten metal bath under a dry nitrogen stream. After 1 minute, the bath temperature was gradually increased to 275 °C over 180 minutes. After being held at 275 °C for 30 minutes, the mixture was gradually subjected to vacuum over the next 15 minutes to a set point of 0.5 torr. The melt was hold at 275 °C at the set point of 0.5 torr for 260 minutes to give Ex 4.

Example 5 (Method 5)

A mixture of 1,4-cyclohexanedicarboxylic acid (17.29 g, 0.1 mole, 10 eq.), 1,4-cyclohexanedimethanol (11.54 g, 0.08 mole, 8 eq.), 1,4-cyclohexanebis(methylamine) (4.27 g, 0.03 mol, 3 eq) and titanium tetraisopropoxide (0.1 M in isopropanol, 0.2 mL, $2.0\times10^{-3}$ eq) were placed in a 250-mL flask equipped with an inlet for nitrogen, a metal stirrer and a short distillation column. The flask was immersed in a 250 °C molten metal bath under a dry nitrogen stream. After 20 min, the bath temperature was gradually increased to 280 °C over 30 min. After being held at 280 °C for 1 min, bath temperature was further increased to 305 °C over 10 min and held for 0.5 min. The mixture was gradually subjected to vacuum over the next 15 minutes to a set point of 0.5 mmHg. The melt was held at 305 °C at 0.5 mmHg for 89.5 min to give Ex 5.

Polyesteramides listed in Table 1 comprise TMCD and were prepared based on one of Methods 1-5.

TABLE 1

TMCD Based Polyesteramides

| Ex # | Meth | Acid 1 (mol) | Acid 2 (mol) | Acid 3 (mol) | Diol 1 (mol) | Diol 2 (mol) | Diamine 1 (mol) | Diamine 2 (mol) |
|---|---|---|---|---|---|---|---|---|
| 6 | 1 | DDA (0.3) | | | TMCD (0.18) | | PACM (0.12) | |
| 7 | 2 | DDA (0.3) | | | TMCD (0.15) | | PACM (0.09) | MACM (0.09) |
| 8 | 2 | DDA (0.3) | | | TMCD (0.15) | | PACM (0.09) | MACM (0.09) |
| 9 | 2 | DDA (0.3) | | | TMCD (0.198) | | PACM (0.06) | MACM (0.06) |
| 10 | 3 | DDA (0.3) | | | TMCD (0.11) | CHDM (0.09) | PACM (0.06) | MACM (0.06) |
| 11 | 3 | DDA (0.35) | | | TMCD (0.16) | CHDM (0.07) | PACM (0.07) | MACM (0.07) |
| 12 | 1 | DDA (0.3) | | | TMCD (0.06) | | PACM (0.24) | |
| 13 | 2 | DDA (0.3) | | | TMCD (0.08) | | PACM (0.12) | MACM (0.12) |
| 14 | 3 | DDA (0.35) | | | TMCD (0.09) | CHDM (0.14) | PACM (0.07) | MACM (0.07) |
| 15 | 2 | DDA (0.24) | AD (0.06) | | TMCD (0.14) | | PACM (0.09) | MACM (0.09) |
| 16 | 1 | DDA (0.24) | 1,3-CHDA (0.06) | | TMCD (0.18) | | PACM (0.12) | |
| 17 | 2 | DDA (0.24) | 1,3-CHDA (0.06) | | TMCD (0.2) | | PACM (0.06) | MACM (0.06) |
| 18 | 2 | DDA (0.24) | 1,3-CHDA (0.06) | | TMCD (0.15) | | PACM (0.09) | MACM (0.09) |
| 19 | 1 | DDA (0.18) | 1,3-CHDA (0.12) | | TMCD (0.18) | | PACM (0.12) | |
| 20 | 1 | DDA (0.24) | 1,3-CHDA (0.06) | | TMCD (0.06) | | PACM (0.24) | |
| 21 | 2 | DDA (0.18) | AD (0.12) | | TMCD (0.14) | | PACM (0.09) | MACM (0.09) |
| 22 | 3 | DDA (0.48) | 1,3-CHDA (0.32) | | TMCD (0.29) | | MPMD (0.56) | |
| 23 | 1 | DDA (0.18) | 1,3-CHDA (0.12) | | TMCD (0.06) | | TMCA (0.24) | |

TABLE 1-continued

TMCD Based Polyesteramides

| Ex # | Meth | Acid 1 (mol) | Acid 2 (mol) | Acid 3 (mol) | Diol 1 (mol) | Diol 2 (mol) | Di-amine 1 (mol) | Di-amine 2 (mol) |
|---|---|---|---|---|---|---|---|---|
| 24 | 1 | DDA (0.18) | 1,3-CHDA (0.12) | | TMCD (0.06) | | CHDMA (0.24) | |
| 25 | 1 | DDA (0.18) | 1,3-CHDA (0.12) | | TMCD (0.06) | | MACM (0.24) | |
| 26 | 3 | DDA (0.22) | 1,3-CHDA (0.14) | | TMCD (0.08) | | MACM (0.29) | |
| 27 | 1 | DDA (0.12) | 1,3-CHDA (0.18) | | TMCD (0.12) | | MACM (0.18) | |
| 28 | 2 | DDA (0.1) | 1,3-CHDM (0.1) | AD (0.1) | TMCD (0.18) | | MACM (0.15) | |
| 29 | 1 | DDA (0.09) | 1,3-CHDA (0.21) | | TMCD (0.11) | | MACM (0.21) | |
| 30 | 1 | DDA (0.09) | 1,3-CHDA (0.21) | | TMCD (0.14) | | MACM (0.18) | |
| 31 | 1 | DDA (0.06) | 1,3-CHDA (0.24) | | TMCD (0.12) | | MACM (0.18) | |
| 32 | 1 | AD (0.3) | | | TMCD (0.183) | | MACM (0.12) | |
| 33 | 1 | AD (0.24) | 1,3-CHDA (0.06) | | TMCD (0.18) | | MACM (0.12) | |
| 34 | 1 | AD (0.24) | 1,3-CHDA (0.06) | | TMCD (0.12) | | MACM (0.18) | |
| 35 | 1 | AD (0.24) | 1,3-CHDA (0.06) | | TMCD (0.06) | | MACM (0.24) | |
| 36 | 1 | AD (0.24) | 1,3-CHDA (0.06) | | TMCD (0.06) | | MACM (0.24) | |
| 37 | 1 | AD (0.18) | 1,3-CHDA (0.12) | | TMCD (0.18) | | MACM (0.12) | |
| 38 | 1 | AD (0.18) | 1,3-CHDA (0.12) | | TMCD (0.12) | | MACM (0.18) | |
| 39 | 1 | AD (0.18) | 1,3-CHDA (0.12) | | TMCD (0.06) | | MACM (0.24) | |
| 40 | 1 | AD (0.12) | 1,3-CHDA (0.18) | | TMCD (0.12) | | MACM (0.18) | |
| 66 | 1 | DDA (0.18) | 1,3-CHDA (0.12) | | TMCD (0.11) | | MACM (0.24) | |
| 67 | 3 | DDA (0.18) | 1,3-CHDA (0.12) | | TMCD (0.11) | | MACM (0.24) | |
| 68 | 3 | DDA (0.15) | 1,3-CHDA (0.10) | | TMCD (0.063 mol) | CHDM (0.025 mol) | MACM (0.20 mol) | |
| 69 | 3 | DDA (0.15) | 1,3-CHDA (0.10) | | TMCD (0.063 mol) | CHDM (0.025 mol) | MACM (0.20 mol) | |
| 70 | 3 | DDA (0.15) | 1,3-CHDA (0.10) | | TMCD (0.09) | | MACM (0.20) | |
| 71 | 3 | DDA (0.15) | 1,3-CHDA (0.10) | | TMCD (0.09) | | MACM (0.20) | |
| 72 | 3 | DDA (0.15) | 1,3-CHDA (0.10) | | TMCD (0.05) | CHDM (0.038) | MACM (0.20) | |

Polyesteramides listed in Table 2 comprise CHDM and were prepared based on one of Methods 1-5.

TABLE 2

CHDM Based Polyesteramides.

| Ex # | Meth | Acid 1 (mol) | Acid 2 (mol) | Acid 3 (mol) | Diol 1 (mol) | Diol 2 (mol) | Di-amine 1 (mol) |
|---|---|---|---|---|---|---|---|
| 41 | 3 | DDA (0.6) | | CHDM (0.37) | | MACM (0.24) | |
| 42 | 3 | DDA (0.45) | | CHDM (0.28) | | PACM (0.18) | |
| 43 | 1 | DDA (0.3) | | CHDM (0.2) | | MACM (0.06) | PACM (0.06) |
| 44 | 4 | DDA (0.3) | | CHDM (0.18) | | MACM (0.127) | |
| 45 | 3 | DDA (0.6) | | CHDM (0.34) | | MACM (0.27) | |
| 46 | 4 | DDA (0.3) | | CHDM (0.17) | | MACM (0.12) | PACM (0.02) |
| 47 | 4 | DDA (0.3) | | CHDM (0.17) | | MACM (0.10) | PACM (0.03) |
| 48 | 4 | DDA (0.3) | | CHDM (0.17) | | MACM (0.09) | PACM (0.04) |
| 49 | 4 | DDA (0.30) | | CHDM (0.16) | | MACM (0.14) | |
| 50 | 3 | DDA (0.3) | | CHDM (0.16) | | PACM (0.15) | |
| 51 | 1 | DDA (0.18) | 1,3-CHDA (0.12) | CHDM (0.07) | | MACM (0.24) | |
| 52 | 3 | AD (0.45) | | CHDM (0.41) | | PACM (0.05) | |
| 53 | 3 | AD (0.45) | | CHDM (0.40) | | PACM (0.06) | |
| 54 | 3 | AD (0.45) | | CHDM (0.39) | | PACM (0.07) | |
| 55 | 4 | AD (0.3) | | CHDM (0.25) | | PACM (0.06) | |
| 56 | 3 | AD (1.0) | | CHDM (0.71) | | PACM (0.15) | MACM (0.16) |
| 57 | 3 | AD (1.0) | | CHDM (0.67) | | PACM (0.15) | MACM (0.18) |
| 58 | 3 | AD (1.0) | | CHDM (0.67) | | MACM (0.33) | |
| 59 | 3 | AD (0.45) | | CHDM (0.3) | | PACM (0.08) | MACM (0.08) |
| 60 | 3 | AD (1.0) | | CHDM (0.65) | | MACM (0.35) | |
| 61 | 3 | AD (1.0) | | CHDM (0.65) | | PACM (0.15) | MACM (0.20) |
| 62 | 3 | AD (0.45) | | CHDM (0.28) | | MACM (0.18) | |
| 63 | 3 | AD (0.45) | | CHDM (0.23) | | PACM (0.09) | MACM (0.14) |
| 64 | 3 | AD (0.45) | | CHDM (0.23) | | MACM (0.23) | |
| 65 | 3 | AD (0.45) | | CHDM (0.19) | | MACM (0.27) | |
| 76 | | SE (0.18) | 1,3-CHDA (0.12) | CHDM (0.13) | | MACM (0.18) | |
| 79 | 3 | DDA (0.40) | AD (0.40) | CHDM (0.51) | | MACM (0.30) | |
| 80 | 3 | DDA (0.25) | AD (0.25) | CHDM (0.33) | | MACM (0.18) | |
| 81 | 3 | DDA (0.334) | AD (0.167) | CHDM (0.318) | | MACM (0.193) | |
| 82 | 3 | DDA (0.334) | AD (0.167) | CHDM (0.313) | | MACM (0.198) | |
| 83 | 3 | DDA (0.334) | AD (0.167) | CHDM (0.308) | | MACM (0.203) | |
| 84 | 3 | DDA (0.4) | | CHDM (0.232) | | MACM (0.16) | PACM (0.02) |
| 85 | 3 | DDA (0.4) | | CHDM (0.232) | | MACM (0.14) | PACM (0.04) |

TABLE 2-continued

CHDM Based Polyesteramides.

| Ex # | Meth | Acid 1 (mol) | Acid 2 (mol) | Acid 3 (mol) | Diol 1 (mol) | Diol 2 (mol) | Di-amine 1 (mol) |
|---|---|---|---|---|---|---|---|
| 86 | 3 | DDA (0.4) | | CHDM (0.232) | | MACM ( ).12) | PACM (0.06) |
| 87 | 3 | DDA (0.4) | | CHDM (0.232) | | MACM (0.10) | PACM (0.08) |
| 88 | 3 | SE (0.5) | | CHDM (0.34) | | MACM (0.17) | |
| 89 | 3 | SE (0.5) | | CHDM (0.33) | | MACM (0.17) | |
| 90 | 3 | DDA (0.5) | | CHDM (0.26) | | MACM (0.25) | |
| 91 | 3 | DDA (0.5) | | CHDM (0.16) | | 1,3-CHDMA (0.36) | |
| 92 | 3 | DDA (0.3) | 1,3-CHDA (0.20) | CHDM (0.31) | | 1,3-CHDMA (0.20) | |
| 93 | 3 | DDA (0.18) | Cis-1,3-CHDA (0.12) | CHDM (0.07) | | MACM (0.24) | |
| 94 | 3 | DDA (0.375) | 1,3-CHDA (0.125) | CHDM (0.39) | | MACM (0.13) | |
| 95 | 3 | DDA (0.45) | 1,4-CHDA (0.05) | CHDM (0.31) | | MACM (0.20) | |
| 96 | 3 | H2-dimer acid (0.2) | | CHDM (0.01) | | MACM (0.19) | |
| 97 | 3 | H2-dimer acid (0.2) | | CHDM (0.03) | | MACM (0.17) | |
| 100 | 3 | DDA (0.50) | | CHDM (0.31) | | PACM (0.20) | |
| 101 | 3 | DDA (0.50) | | CHDM (0.29) | | PACM (0.23) | |
| 102 | 3 | DDA (0.50) | | CHDM (0.26) | | PACM (0.25) | |
| 103 | 3 | DDA (0.5) | | CHDM (0.2) | | MACM (0.24) | |
| 104 | 3 | DDA (0.50) | | CHDM (0.20) | 1,4-BDO (0.08) | PACM (0.25) | |
| 105 | 3 | DDA (0.50) | | CHDM (0.13) | 1,4-BDO (0.15) | PACM (0.25) | |
| 106 | 3 | DDA (0.50) | | CHDM (0.05) | 1,4-BDO (0.23) | PACM (0.25) | |
| 107 | 3 | DDA (0.450) | | CHDM (0.11) | 1,4-BDO (0.16) | PACM (0.23) | |
| 108 | 3 | DDA (0.55) | | CHDM (0.06) | 1,4-BDO (0.45) | PACM (0.14) | MACM (0.14) |
| 109 | 3 | DDA (0.45) | | CHDM (0.26) | | PACM (0.09) | MACM (0.11) |
| 110 | 3 | DDA (0.46) | | CHDM (0.22) | PTMG1 (0.04) | PACM (0.12) | MACM (0.09) |
| 111 | 4 | DDA (0.25) | | CHDM (0.13) | | MACM (0.125) | |
| 112 | 4 | DDA (0.25) | | CHDM (0.105) | | MACM (0.15) | |
| 182 | 3 | DDA (0.2) | | CHDM (0.1) | PTMG2 (0.02) | MACM (0.09) | |

TABLE 3 provides polyesteramides with TMP incorporated as a branching agent.
Polyesteramides with TMP branching agent.

| Ex # | Meth | Acid 1 (mol) | Acid 2 (mol) | Diol 1 (mol) | Diol 2 (mol) | Diamine 1 (mol) | Diamine 2 (mol) | Branching Agent (mol) |
|---|---|---|---|---|---|---|---|---|
| 113 | 1 | DDA (0.18) | 1,3-CHDA (0.12) | TMCD (0.08) | | MACM (0.24) | | TMP (0.0008) |
| 114 | 3 | DDA (0.46) | | CHDM (0.26) | | MACM (0.12) | PACM (0.09) | TMP (0.0012) |
| 115 | 3 | SE (0.43) | ODA (0.05) | CHDM (0.28) | | MACM (0.21) | | TMP (0.0012) |
| 116 | 3 | SE (0.43) | ODA (0.05) | CHDM (0.28) | | MACM (0.06) | PACM (0.14) | TMP (0.0012) |
| 117 | 3 | SE (0.43) | ODA (0.05) | CHDM (0.27) | | MACM (0.22) | | TMP (0.0012) |
| 118 | 3 | SE (0.43) | ODA (0.05) | CHDM (0.28) | | MACM (0.13) | PACM (0.07) | TMP (0.0012) |
| 119 | 3 | SE (0.50) | | CHDM (0.29) | | MACM (0.22) | | TMP (0.0013) |
| 120 | 3 | SE (0.50) | | CHDM (0.29) | | MACM (0.22) | | TMP (0.0013) |
| 121 | 3 | SE (0.50) | | CHDM (0.28) | | MACM (0.23) | | TMP (0.0013) |
| 122 | 3 | SE (0.50) | | CHDM (0.29) | | MACM (0.19) | PACM (0.03) | TMP (0.0013) |
| 123 | 3 | DDA (0.50) | | CHDM (0.30) | | MACM (0.20) | | TMP (0.005) |
| 124 | 3 | DDA (0.50) | | CHDM (0.31) | | MACM (0.20) | | TMP (0.0025) |

TABLE 3-continued provides polyesteramides with TMP incorporated as a branching agent.
Polyesteramides with TMP branching agent.

| Ex # | Meth | Acid 1 (mol) | Acid 2 (mol) | Diol 1 (mol) | Diol 2 (mol) | Diamine 1 (mol) | Diamine 2 (mol) | Branching Agent (mol) |
|---|---|---|---|---|---|---|---|---|
| 125 | 3 | DDA (0.50) | | CHDM (0.31 | | MACM (0.20) | | TMP (0.0005) |
| 126 | 3 | DDA (0.90) | | CHDM (0.55) | | MACM (0.36) | | TMP (0.0023) |
| 127 | 3 | DDA (0.50) | | CHDM (0.31) | | MACM (0.20) | | TMP (0.0025) |
| 128 | 3 | DDA (0.5) | | CHDM (0.26) | | MACM (0.24) | | TMP (0.005) |
| 129 | 3 | DDA (0.5) | | CHDM (0.26) | | MACM (0.08) | PACM (0.18) | TMP (0.0025) |
| 130 | 3 | DDA (0.5) | | CHDM (0.27) | | MACM (0.24) | | TMP (0.0013) |
| 131 | 3 | DDA (0.45) | | CHDM (0.25) | | MACM (0.21) | | TMP (0.0011) |
| 132 | 3 | DDA (0.45) | | CHDM (0.25) | | MACM (0.21) | | TMP (0.0011) |
| 133 | 4 | DDA (0.40) | | CHDM (0.13) | | 1,3-CHDMA (0.28) | | TMP (0.001) |
| 134 | 3 | DDA (0.45) | 1,4-CHDA (0.05) | CHDM (0.28) | | MACM (0.23) | | TMP (0.0013) |
| 136 | 3 | DDA (0.45) | ODA (0.05) | CHDM (0.27) | | MACM (0.24) | | TMP (0.0013) |
| 137 | 3 | DDA (0.45) | H2-dimer acid (0.05) | CHDM (0.27) | | MACM (0.24) | | TMP (0.0013) |
| 138 | 3 | DDA (0.5) | | CHDM (0.18) | TMCD (0.17) | MACM (0.23) | | TMP (0.0013) |
| 139 | 3 | DDA (05) | | CHDM (0.22) | | MACM (0.24) | MDEA (0.05) | TMP (0.0013) |
| 140 | 3 | DDA (0.36) | ODA (0.04) | CHDM (0.22) | | MACM (0.19) | | TMP (0.0010) |
| 141 | 3 | DDA (0.36) | ODA (0.04) | CHDM (0.22) | | MACM (0.07) | PACM (0.12) | TMP (0.0010) |
| 142 | 3 | DDA (0.41) | H2-dimer acid (0.02) | CHDM (0.24) | | MACM (0.20) | | TMP (0.0011) |
| 143 | 3 | DDA (0.41) | H2-dimer acid (0.02) | CHDM (0.24) | | MACM (0.14) | PACM (0.06) | TMP (0.0011) |
| 144 | 3 | DDA (0.46) | | CHDM (0.26) | | PACM (0.09) | MACM (0.12) | TMP (0.0012) |
| 145 | 4 | SE (0.35) | | CHDM (0.21) | | MACM (0.15) | | TMP (0.0009) |
| 146 | 4 | DDA (0.35) | | CHDM ((0.19) | | MACM (0.15) | PACM (0.02) | TMP (0.0009) |
| 147 | 4 | DDA (0.35) | | CHDM (0.19) | | MACM (0.13) | PACM (0.04) | TMP (0.0009) |
| 148 | 4 | AZ (0.30) | | CHDM (0.18) | | PACM (0.13) | | TMP (0.008) |
| 149 | 4 | AZ (0.40) | | CHDM (0.24) | | MACM (0.17) | | TMP (0.001) |
| 150 | 4 | DDA (0.40) | | CHDM (0.30) | | MACM (0.11) | | TMP (0.001) |
| 151 | 4 | DDA (0.40) | | CHDM (0.31) | | MACM (0.11) | | TMP (0.001) |
| 152 | 4 | DDA (0.04) | | CHDM (0.33) | | MACM (0.08) | | TMP (0.001) |
| 153 | 4 | DDA (0.20) | AZ 0.20) | CHDM (0.23) | | PACM (0.18) | | TMP (0.001) |
| 154 | 4 | SE (0.20) | AZ (0.20) | CHDM (0.23) | | PACM (0.18) | | TMP (0.001) |
| 155 | 4 | DDA (0.4) | | CHDM (0.21) | | TCDA (0.20) | | TMP (0.001) |
| 156 | 4 | DDA (0.4) | | CHDM (0.25) | | TCDA (0.16) | | TMP (0.001) |
| 157 | 4 | DDA (0.35) | | CHDM (0.182) | | MACM (0.175) | | TMP (0.001) |

TABLE 3-continued provides polyesteramides with TMP incorporated as a branching agent.
Polyesteramides with TMP branching agent.

| Ex # | Meth | Acid 1 (mol) | Acid 2 (mol) | Diol 1 (mol) | Diol 2 (mol) | Diamine 1 (mol) | Diamine 2 (mol) | Branching Agent (mol) |
|---|---|---|---|---|---|---|---|---|
| 158 | 4 | DDA (0.35) | | CHDM (0.181) | | MACM (0.175) | | TMP (0.002) |
| 159 | 4 | DDA (0.35) | | CHDM (0.17) | | MACM (0.19) | | TMP (0.0006) |
| 160 | 4 | DDA (0.35) | | CHDM (0.17) | | MACM (0.19) | | TMP (0.0012) |
| 161 | 4 | DDA (0.45) | | CHDM (0.25) | | MACM (0.21) | | TMP (0.003) |
| 162 | 4 | DDA (0.40) | | CHDM (0.25) | | MACM (0.148) | PACM (0.04) | TMP (0.001) |
| 163 | 4 | DDA (0.40) | | CHDM (0.33) | | MACM (0.06) | PACM (0.12) | TMP (0.001) |
| 164 | 4 | DDA (0.40) | | CHDM (0.218) | | MACM (0.188) | | TMP (0.004) |
| 165 | 4 | DDA (0.40) | | CHDM (0.215) | | MACM (0.188) | | TMP (0.006) |
| 166 | 4 | DDA (0.40) | | CHDM (0.212) | | MACM (0.188) | | TMP (0.008) |
| 167 | 4 | DDA (0.40) | | CHDM (0.214) | | MACM (0.188) | | TMP (0.001) |

Example 168 (Method 6)

A mixture of 1,12-dodecandioic acid (92.12 g, 0.40 mole, 10 eq.), 1,4-cyclohexanedimethanol (32.30 g, 0.22 mole, 5.6 eq.), 4,4'-methylenebis(2-methylcyclohexylamine) (44.82 g, 0.19 mol, 4.7 eq) and titanium tetraisopropoxide (0.64 wt % in butanol, 1.19 g, 50 ppm) were placed in a 500-mL flask equipped with an inlet for nitrogen, a metal stirrer and a short distillation column. The flask was immersed in a 200 °C molten metal bath under a dry nitrogen stream. After 1 minute, the bath temperature was gradually increased to 290 °C over 180 minutes. After reaching 290 °C, trimethoxy[2-(7-oxabicyclo[4.1.0]hept-3-yl)ethyl]silane (10 wt % in Toluene, 2.46 g, 0.25%) was added through a side port. After being held at 290 °C for 30 minutes, the mixture was gradually subjected to vacuum over the next 15 minutes to a set point of 0.5 torr. The melt was held at 290 °C at the set point of 0.5 torr for 260 minutes to give Ex 168.

TABLE 4

Polyesteramides with silane to improve glass adhesion.

| Ex # | Meth | Acid 1 (mol) | Diol 1 (mol) | Diamine 1 (mol) | TMP | Epoxy Silane (mol) |
|---|---|---|---|---|---|---|
| 169 | 4 | DDA (0.4) | CHDM (0.22) | MACM (0.19) | | GPTMS (0.0005) |
| 170 | 6 | DDA (0.4) | CHDM (0.22) | MACM (0.19) | | GPTMS (0.0005) |
| 171 | 3 | DDA (0.45) | CHDM (0.25) | MACM (0.21) | | ECTMS (0.0011) |
| 172 | 4 | DDA (0.45) | CHDM (0.25) | MACM (0.21) | | ECTMS (0.0011) |
| 173 | 4 | DDA (0.30) | CHDM (0.17) | MACM (0.14) | | Added after releasing the vacuum ECTMS (0.0008) |
| 174 | 4 | DDA (0.30) | CHDM (0.16) | MACM (0.14) | TMP (0.0008) | Added after releasing the vacuum ECTMS (0.0008) |

TABLE 4-continued

Polyesteramides with silane to improve glass adhesion.

| Ex # | Meth | Acid 1 (mol) | Diol 1 (mol) | Diamine 1 (mol) | TMP | Epoxy Silane (mol) |
|---|---|---|---|---|---|---|
| 175 | 4 | DDA (0.30) | CHDM (0.16) | MACM (0.14) | TMP (0.0008) | Added after releasing the vacuum ECTMS (0.0008) |
| 176 | 4 | DDA (0.30) | CHDM (0.16) | MACM (0.14) | TMP (0.0008) | Added after releasing the vacuum ECTMS (0.0008) |
| 177 | 4 | DDA (0.35) | CHDM (0.19) | MACM (0.16) | TMP (0.0008) | Added after releasing the vacuum ECTMS (0.0004) |
| 178 | 6 | DDA (0.4) | CHDM (0.22) | MACM (0.19) | TMP (0.001) | ECTMS (0.0005) |

TABLE 5

Polyesteramides with UV absorber.

| Ex # | Meth | Acid 1 (mol) | Acid 2 (mol) | Diol 1 (mol) | Diol 2 (mol) | Diamine 1 (mol) | TMP | Add |
|---|---|---|---|---|---|---|---|---|
| 179 | 3 | DDA (0.45) | | CHDM (0.25) | | MACM (0.21) | TMP (0.0011) | T928 (0.35%) |
| 180 | 3 | DDA (0.45) | | CHDM (0.25) | | MACM (0.21) | TMP (0.0011) | T928 (0.20%) |
| 181 | 3 | DDA (0.45) | | CHDM (0.25) | | MACM (0.21) | TMP (0.0011) | T928 (0.10%) |

Table 6 provides the inherent viscosity, glass transition temperature for TMCD comprising polyesteramides.

TABLE 6

| Ex # | Ih.V. dL/g | 2nd heat $T_g$ (° C.) [$T_m$ (° C.)] |
|---|---|---|
| 1 | 0.76 | 167 |
| 2 | 1.08 | 66 |
| 6 | 0.65 | 16 |
| 7 | 1.18 | 102 |
| 8 | 0.99 | 99 |
| 9 | 1.10 | 59 |
| 10 | 0.84 | 57 |
| 11 | 0.92 | 48 |
| 12 | 0.76 | 99.3 [141.4] |
| 13 | 1.14 | 133 |
| 14 | 0.85 | 39 |
| 15 | 0.68 | 102 |
| 16 | 0.57 | 32 |
| 17 | 0.49 | 73 |
| 18 | 0.56 | 112 |
| 19 | 0.71 | 84[223] |
| 20 | 0.75 | 123[187, 222] |
| 21 | 0.60 | 108 |
| 22 | 0.50 | 51 |
| 23 | 0.26 | 80 |
| 24 | 0.33 | 129 |
| 25 | 0.72 | 157 |
| 26 | 0.65 | — |
| 27 | 0.65 | 153.4 |
| 28 | 0.45 | 125 |
| 29 | 0.65 | 178.7 |
| 30 | 0.58 | 163.2 |
| 31 | 0.60 | 179.5 |
| 32 | 0.61 | 98.8 |
| 33 | 0.61 | 117.6 |
| 34 | 0.72 | 153.6 |
| 35 | 0.68 | 179 |
| 36 | 0.69 | 179.3 |
| 37 | 0.62 | 130.7 |
| 38 | 0.62 | 164.7 |
| 39 | 0.52 | 188.1 |
| 40 | 0.59 | 180.9 |
| 42 | 0.35 | 23.9[228.3] |
| 66 | 0.44 | 152.6 |
| 67 | 0.737 | 152.5 |
| 68 | 0.649 | 153.3 |
| 69 | 0.623 | 151.8 |
| 70 | 0.592 | 157 |
| 71 | 0.585 | 156.1 |
| 72 | 0.846 | 156.8 |

Table 7 provides the inherent viscosity, glass transition temperature for CHDM comprising polyesteramides.

TABLE 7

| Ex # | Ih.V. (dL/g) | 2nd heat $T_g$ (° C.) [$T_m$ (° C.)] |
|---|---|---|
| 3 | 0.93 | 35 |
| 4 | 1.08 | 50 |
| 5 | 0.78 | 98 |
| 41 | 1.08 | 21. |
| 42 | 0.35 | — |
| 43 | 0.70 | 41.5 |
| 44 | 1.03 | 48 |
| 45 | 1.05 | 53.8 |
| 46 | 0.90 | 47 |
| 47 | 1.08 | 49 |
| 48 | 1.14 | 50 |
| 49 | 1.18 | 90 |
| 50 | 0.42 | 19 [201] |
| 51 | 0.90 | 151 |
| 52 | 0.99 | −13.2 |
| 53 | 1.02 | −9.1 |
| 54 | 0.83 | −9.3 |
| 55 | 1.18 | 90 |
| 56 | 0.63 | 32 |
| 57 | 0.58 | 50 |
| 58 | 1.02 | 54 |

TABLE 7-continued

| Ex # | Ih.V. (dL/g) | 2nd heat $T_g$ (° C.) [$T_m$ (° C.)] |
|---|---|---|
| 59 | 0.98 | 53 |
| 60 | 0.97 | 52 |
| 61 | 1.01 | 48 |
| 62 | 0.88 | 69.3 |
| 63 | 0.92 | 80.9 |
| 64 | 1.07 | 99 |
| 65 | 0.84 | 121.1 |
| 76 | 0.748 | 118 |
| 79 | 0.992 | 41 |
| 80 | 1.071 | 54 |
| 81 | 0.982 | 51 |
| 82 | 0.988 | 56 |
| 83 | 0.887 | 50 |
| 84 | 0.909 | 49.66 |
| 85 | 0.996 | 47.5 [127, 172] |
| 86 | 1.073 | 47.1 [134, 168] |
| 87 | 1.027 | 45.6 [115.5, 166.6] |
| 88 | 0.919 | 40.3 |
| 89 | 0.991 | 45.2 |
| 90 | 0.898 | 60.2 |
| 91 | 0.864 | 48.2 |
| 92 | 0.759 | 32.5 |
| 93 | 0.709 | 152 |
| 94 | 0.339 | −16.4 |
| 95 | 0.267 | −14.7 |
| 96 | 0.664 | 70.7 |
| 97 | 0.628 | 58.6 |
| 100 | 1.02 | 3.29 |
| 101 | 1.13 | 17.8 |
| 102 | 0.996 | 26.4 |
| 103 | 0.835 | 46.5 |
| 104 | 1.035 | 52.9[212] |
| 105 | 0.446 | 39.2[221] |
| 106 | 0.885 | 43.2[216] |
| 107 | 1.023 | 40[216] |
| 108 | 0.711 | 45.2[154, 189] |
| 109 | 0.997 | 49.7 |
| 110 | 0.873 | 45[175] |
| 111 | 1.109 | 63 |
| 112 | 1.082 | 83 |
| 182 | 0.89 | 43.0 |

Table 8 provides the properties for polyesteramides incorporated with TMP.

TABLE 8

| Ex # | Ih.V. (dL/g) | $2^{nd}$ heat Tg(° C.) [Tm(° C.)] |
|---|---|---|
| 113 | 0.588 | 153.2 |
| 114 | 1.012 | 48.1[138, 171] |
| 115 | 1.101 | 49.8 |
| 116 | 1.161 | 45.9 |
| 117 | 0.928 | 55.8 |
| 118 | 0.941 | 46.6[126, 169] |
| 119 | 1.188 | 55.6 |
| 120 | 1.203 | 55.8 |
| 121 | 1.133 | 59.9 |
| 122 | 1.169 | 58.0 |
| 123 | 1.098 | 42.8 |
| 124 | 1.105 | 41.1 |
| 125 | 0.927 | 45.9 |
| 126 | 1.034 | 47.4 |
| 127 | 1.128 | 47.8 |
| 128 | 1.118 | 64.3 |
| 129 | 1.157 | 54.3[180] |
| 130 | 1.112 | 54.3 |
| 131 | 0.965 | 52.8 |
| 132 | 1.071 | 55.6 |
| 133 | 1.205 | 36.1 |
| 134 | 1.155 | 60 |
| 136 | 1.042 | 55.3 |
| 137 | 1.037 | 43.6 |
| 138 | 0.762 | 56.8 |

TABLE 8-continued

| Ex # | Ih.V. (dL/g) | $2^{nd}$ heat Tg(° C.) [Tm(° C.)] |
|---|---|---|
| 139 | 0.846 | 53.1 |
| 140 | 1.062 | 50 |
| 141 | 1.059 | 49.2 |
| 142 | 1.096 | 46.2 |
| 143 | 1.056 | 54.1 |
| 144 | 1.068 | 40[170] |
| 145 | 1.079 | 51.5 |
| 146 | 1.123 | 48.4 |
| 147 | 1.167 | 52 |
| 148 | 1.207 | 25.2[74, 205] |
| 149 | 1.107 | −26.6[73, 124] |
| 150 | 1.088 | — |
| 151 | 1.107 | −26.6[73, 124] |
| 152 | 1.138 | −28.9[114] |
| 153 | 1.171 | 41.2[176, 203] |
| 154 | 1.108 | 456[171] |
| 155 | 1.091 | 17.1 |
| 156 | 1.069 | 1.07 |
| 157 | 1.289 | 62.3 |
| 158 | 1.338 | 60.3 |
| 159 | 1.216 | 69.8 |
| 160 | 1.335 | 70.5 |
| 161 | 1.648 | 56.7 |
| 162 | 1.052 | 50.2 |
| 163 | 0.997 | 48.8 [140, 177] |
| 164 | 1.762 | 54.9 |
| 165 | 1.508 | 54.7 |
| 166 | Nd | 58.3 |
| 167 | 1.102 | 53.3 |

Table 9 provides the properties for polyesteramides reacted with silanes

TABLE 9

| Ex # | Ih.V. (dL/g) | $2^{nd}$ heat Tg (° C.) [Tm(° C.)] |
|---|---|---|
| 168 | 0.875 | 48 |
| 169 | 1.294 | 52.8 |
| 170 | 1.096 | 48.4 |
| 171 | 0.74 | 52.9 |
| 172 | 0.384 | 53.9 |
| 173 | 0.819 | 50.6 |
| 174 | 0.993 | 48.1 |
| 175 | 0.981 | 47.5 |
| 176 | 0.950 | 47.3 |
| 177 | 1.245 | 54.6 |
| 178 | 1.277 | 55.3 |

Table 10 provides the properties of the polyesteramides that were blended with UV absorbers.

TABLE 10

| Ex # | Ih.V. (dL/g) | $2^{nd}$ heat Tg (° C.) [Tm(° C.)] |
|---|---|---|
| 179 | 1.109 | 59.6 |
| 180 | 1.015 | 51.3 |
| 181 | 1.063 | 51.9 |

Table 11 provides the inherent viscosity and glass transition information for select comparative examples.

TABLE 11

| Ex # | 2nd heat $T_g(T_m)$ |
|---|---|
| Eastman Tritan ™ Copolyester TX2001 | 116 |
| Eastman Tritan ™ Copolyester TX1001 | 108 |
| Zeon ZeonorFilm ZF14 | 136 |
| Konica TAC | 160-170 |
| TOYOBO PET | ~80 |

What is claimed is:

1. A polyesteramide comprising:

(a) a diamine component comprising:

30-50 mole % of diamine residues derived from diamine which is $CH_2((C_{3-8})$cycloalkyl-$NH_2)_2$;

(b) a diol component comprising:

50-70 mole % of diol residues derived from a diol which is $(C_{3-8})$cycloalkyl di($(C_{1-3})$alkanol); and (c) a diacid component comprising:

10 to 100 mole % of diacid residues derived from a diacid that is the combination of $HO_2C$-$(C_{2-40})$alkylene-$CO_2H$ and $HO_2H$ and $HO_2C$-$(C_{3-10})$cycloalkyl-$CO_2H$, or $HO_2C$-$(C_{3-10})$cycloalkyl-$CO_2H$;

wherein each cycloalkyl is unsubstituted or substituted by 1-4 $(C_{1-3})$alkyl, wherein the total mole % of the diacid component is 100 mole %, and wherein the total mole % of the combined diol and diamine component is 100 mole $\%_1$ wherein the polyesteramide further comprises branching agent residues derived from a compound chosen from trimellitic acid, trimethylolpropane, trimethylolethane, glycerol, pentaerythritol, citric acid, tartaric acid, 3-hydroxyglutaric acid, glycerineerythritol, threitol, dipentaerythritol, sorbitol, trimellitic anhydride, pyromelltic dianhydride, trimesic acid or dimethylol propionic acid.

2. The polyesteramide of claim 1, wherein the diamine is chosen from 4,4'-methylenebis(2-methylcyclohexylamine), or 4,4'-methylenebis(cyclohexylamine).

3. The polyesteramide of claim 1, wherein the diol is chosen from 1,3-cyclohexanedimethanol or 1,4-cyclohexanedimethanol.

4. The polyesteramide of claim 3, wherein the diol is 1,3-cyclohexanedimethanol.

5. The polyesteramide of claim 3, wherein the diol is 1,4-cyclohexandimethanol.

6. The polyesteramide of claim 1, wherein the branching agent residues are present from about 0.001 to about 10 weight % based on the total weight of the polyesteramide.

7. The polyesteramide of claim 1, further comprises silane residues derived from an epoxy silane or an isocyanate silane, wherein the silane residues are present from 0.001 to 10 weight % based on the total weight of the polyesteramide.

8. The polyesteramide of claim 1, wherein the polyesteramide has a glass transition temperature in the range of from about −30 °C to about 20 °C.

9. The polyesteramide of claim 1, wherein the polyesteramide has a glass transition temperature in the range of from about 20 °C to about 90 °C.

10. The polyesteramide of claim 1, wherein the polyesteramide has a glass transition temperature in the range of from about 90 °C to about 130 °C.

11. The polyesteramide of claim 1, wherein the polyesteramide has a glass transition temperature in the range of from about 130 °C to about 200 °C.

12. The polyesteramide of claim 1, wherein the polyesteramide has an inherent viscosity of from about 0.3 dL/g to about 2.0 dL/g as determined according to ASTM D2857-70.

13. A composition comprising at least one polyesteramide of claim 1.

14. The composition of claim 13, wherein the composition further comprises an additive chosen from antioxidants, colorants, mold release agents, flame retardants, plasticizers, nucleating agents, UV stabilizers, UV absorbers, thermal stabilizers, glass fibers, carbon fibers, fillers, or impact modifiers.

15. The composition of claim 13, further comprising a polymer chosen from a polyesteramide other than those of claim 1, cellulose esters, polyvinyl chloride, a nylon, a polyester, a polyamide, a polyvinyl alcohol, a polyvinyl acetate, a polyvinyl butyral, a polystyrene, a polystyrene copolymer, a styrene acrylonitrile copolymer, an acrylonitrile butadiene styrene copolymer, a poly(methylmethacrylate), an acrylic copolymer, a poly(ethery-imide), a polyphenylene oxide, a polyphenylene sulfide, a polysulfone, a polysulfone ether, or a poly(ether-ketone) of an aromatic dihydroxy compound.

* * * * *